(12) United States Patent
Ott

(10) Patent No.: US 10,473,875 B2
(45) Date of Patent: Nov. 12, 2019

(54) MODULAR HIGH DENSITY TELECOMMUNICATIONS FRAME AND CHASSIS SYSTEM

(71) Applicant: CommScope Technologies LLC, Hickory, NC (US)

(72) Inventor: Michael James Ott, Hudson, WI (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 15/958,618

(22) Filed: Apr. 20, 2018

(65) Prior Publication Data

US 2018/0306996 A1 Oct. 25, 2018

Related U.S. Application Data

(63) Continuation of application No. 15/256,167, filed on Sep. 2, 2016, now Pat. No. 9,952,398, which is a continuation of application No. 14/213,077, filed on Mar. 14, 2014, now Pat. No. 9,435,975.

(60) Provisional application No. 61/790,127, filed on Mar. 15, 2013.

(51) Int. Cl.
*G02B 6/44* (2006.01)
*G02B 6/38* (2006.01)

(52) U.S. Cl.
CPC ......... *G02B 6/4452* (2013.01); *G02B 6/3897* (2013.01); *G02B 6/4453* (2013.01)

(58) Field of Classification Search
CPC .................................................. G02B 6/4452
See application file for complete search history.

(56) References Cited

U.S. PATENT DOCUMENTS

| 2,092,430 A | 9/1937 | Stratton |
| 3,368,688 A * | 2/1968 | Weiss ................... A47B 63/067 |
| | | 211/1.56 |
| 3,603,747 A | 9/1971 | Davis |
| 3,736,036 A * | 5/1973 | Mathus .............. G11B 23/0236 |
| | | 312/202 |
| 3,764,190 A | 10/1973 | Anderson |

(Continued)

FOREIGN PATENT DOCUMENTS

| AU | 40995/85 | 4/1985 |
| AU | 55314/86 | 3/1986 |

(Continued)

OTHER PUBLICATIONS

International Search Report and Written Opinion for PCT/US2012/058955 dated May 15, 2013.

(Continued)

*Primary Examiner* — Peter Radkowski
(74) *Attorney, Agent, or Firm* — Merchant & Gould P.C.

(57) ABSTRACT

A fiber optic telecommunications device includes a frame defining a right vertical support and a left vertical support. A chassis is mounted to the right and left vertical supports, wherein the chassis is configured to pivot about a pivot axis that is defined by one of the right and left vertical supports. A plurality of modules are mounted on the chassis, each of the modules slidable on the chassis along a direction extending between the right and left vertical supports, wherein the chassis is configured to pivot about a plane parallel to the sliding direction of the modules, each module defining fiber optic connection locations.

9 Claims, 26 Drawing Sheets

(56) References Cited

U.S. PATENT DOCUMENTS

| | | | |
|---|---|---|---|
| RE28,134 E | 8/1974 | Davis | |
| 3,888,558 A | 6/1975 | Himsl | |
| 4,359,262 A | 11/1982 | Dolan | |
| 4,502,754 A | 3/1985 | Kawa | |
| 4,516,189 A | 5/1985 | Seaks, Jr. | |
| 4,585,303 A | 4/1986 | Pinsard et al. | |
| 4,595,255 A | 6/1986 | Bhatt et al. | |
| 4,630,886 A | 12/1986 | Lauriello et al. | |
| 4,697,874 A | 10/1987 | Nozick | |
| 4,699,455 A | 10/1987 | Erbe et al. | |
| 4,700,846 A * | 10/1987 | Schroder | H05K 7/1417 211/41.17 |
| 4,708,430 A | 11/1987 | Donaldson et al. | |
| 4,717,231 A | 1/1988 | Dewez et al. | |
| 4,733,936 A | 3/1988 | Mikolaicyk et al. | |
| 4,736,100 A | 4/1988 | Vastagh | |
| 4,747,020 A | 5/1988 | Brickley et al. | |
| 4,765,710 A | 8/1988 | Burmeister et al. | |
| 4,792,203 A | 12/1988 | Nelson et al. | |
| 4,824,196 A | 4/1989 | Bylander | |
| 4,861,134 A | 8/1989 | Alameel et al. | |
| 4,900,123 A | 2/1990 | Barlow et al. | |
| 4,948,220 A | 8/1990 | Violo et al. | |
| 4,971,421 A | 11/1990 | Ori | |
| 4,986,762 A | 1/1991 | Keith | |
| 4,995,688 A | 2/1991 | Anton et al. | |
| 5,011,257 A | 4/1991 | Wettengel et al. | |
| 5,023,646 A | 6/1991 | Ishida et al. | |
| 5,058,983 A | 10/1991 | Corke et al. | |
| 5,067,784 A | 11/1991 | Debortoli et al. | |
| 5,071,211 A | 12/1991 | Debortoli et al. | |
| 5,073,042 A | 12/1991 | Mulholland et al. | |
| 5,076,688 A | 12/1991 | Bowen et al. | |
| 5,100,221 A | 3/1992 | Carney et al. | |
| 5,109,447 A | 4/1992 | Chan | |
| 5,127,082 A | 6/1992 | Below et al. | |
| 5,129,030 A | 7/1992 | Petrunia | |
| 5,138,688 A | 8/1992 | Debortoli | |
| 5,142,598 A | 8/1992 | Tabone | |
| 5,142,606 A | 8/1992 | Carney et al. | |
| 5,155,785 A | 10/1992 | Holland et al. | |
| 5,160,188 A | 11/1992 | Rorke et al. | |
| 5,167,001 A | 11/1992 | Debortoli et al. | |
| 5,179,618 A | 1/1993 | Anton | |
| 5,207,335 A * | 5/1993 | Voelz | B65G 1/133 198/793 |
| 5,208,885 A | 5/1993 | Dragone et al. | |
| 5,212,761 A | 5/1993 | Petrunia | |
| 5,214,735 A | 5/1993 | Henneberger et al. | |
| 5,233,674 A | 8/1993 | Vladic | |
| 5,235,665 A | 8/1993 | Marchesi et al. | |
| 5,259,051 A | 11/1993 | Burack et al. | |
| 5,274,729 A | 12/1993 | King et al. | |
| 5,274,731 A | 12/1993 | White | |
| 5,287,425 A | 2/1994 | Chang | |
| 5,289,558 A | 2/1994 | Teichler et al. | |
| 5,317,663 A | 5/1994 | Beard et al. | |
| 5,318,259 A | 6/1994 | Fussier | |
| 5,333,221 A | 7/1994 | Briggs et al. | |
| 5,333,222 A | 7/1994 | Belenkiy | |
| 5,335,349 A | 8/1994 | Kutsch et al. | |
| 5,353,367 A | 10/1994 | Czosnowski et al. | |
| 5,359,688 A | 10/1994 | Underwood | |
| 5,363,440 A | 11/1994 | Daoud | |
| 5,363,465 A | 11/1994 | Korkowski et al. | |
| 5,363,467 A | 11/1994 | Keith | |
| 5,367,598 A | 11/1994 | Devenish, III et al. | |
| 5,402,515 A | 3/1995 | Vidacovich et al. | |
| 5,408,557 A | 4/1995 | Hsu | |
| RE34,955 E | 5/1995 | Anton et al. | |
| 5,412,751 A | 5/1995 | Siemon et al. | |
| 5,420,958 A | 5/1995 | Henson et al. | |
| 5,430,823 A | 7/1995 | Dupont et al. | |
| 5,432,875 A | 7/1995 | Korkowski et al. | |
| 5,438,641 A | 8/1995 | Malacarne | |
| 5,442,726 A | 8/1995 | Howard et al. | |
| 5,448,015 A | 9/1995 | Jamet et al. | |
| 5,461,690 A | 10/1995 | Lampert | |
| 5,469,526 A | 11/1995 | Rawlings | |
| 5,490,229 A | 2/1996 | Ghandeharizadeh et al. | |
| 5,497,444 A | 3/1996 | Wheeler | |
| 5,509,096 A | 4/1996 | Easley | |
| 5,511,144 A | 4/1996 | Hawkins et al. | |
| 5,530,783 A | 6/1996 | Belopolsky et al. | |
| 5,542,015 A | 7/1996 | Hultermans | |
| 5,570,450 A | 10/1996 | Fernandez et al. | |
| 5,613,030 A | 3/1997 | Hoffer et al. | |
| 5,636,138 A | 6/1997 | Gilbert et al. | |
| 5,647,043 A | 7/1997 | Anderson et al. | |
| 5,655,044 A | 8/1997 | Finzel et al. | |
| 5,689,604 A | 11/1997 | Janus et al. | |
| 5,708,751 A | 1/1998 | Mattei | |
| 5,715,348 A | 2/1998 | Falkenberg et al. | |
| 5,717,810 A | 2/1998 | Wheeler | |
| 5,734,776 A | 3/1998 | Puetz | |
| 5,742,480 A | 4/1998 | Sawada et al. | |
| 5,758,002 A | 5/1998 | Walters | |
| 5,758,003 A | 5/1998 | Wheeler et al. | |
| 5,764,844 A | 6/1998 | Mendes | |
| 5,765,698 A | 6/1998 | Bullivant | |
| 5,774,245 A | 6/1998 | Baker | |
| 5,774,612 A | 6/1998 | Belenkiy et al. | |
| 5,778,131 A * | 7/1998 | Llewellyn | G02B 6/4455 385/135 |
| 5,781,686 A | 7/1998 | Robinson et al. | |
| 5,784,515 A | 7/1998 | Tamaru et al. | |
| 5,823,646 A | 10/1998 | Arizpe et al. | |
| 5,825,955 A | 10/1998 | Ernst et al. | |
| 5,841,917 A | 11/1998 | Jungerman et al. | |
| 5,870,519 A | 2/1999 | Jenkins et al. | |
| 5,883,995 A | 3/1999 | Lu | |
| 5,887,095 A | 3/1999 | Nagase et al. | |
| 5,889,910 A | 3/1999 | Igl et al. | |
| 5,903,698 A | 5/1999 | Poremba et al. | |
| 5,909,526 A | 6/1999 | Roth et al. | |
| 5,930,425 A | 7/1999 | Abel et al. | |
| 5,945,633 A | 8/1999 | Ott et al. | |
| 5,946,440 A * | 8/1999 | Puetz | G02B 6/4455 385/135 |
| 5,956,444 A | 9/1999 | Duda et al. | |
| 5,966,492 A | 10/1999 | Bechamps et al. | |
| 5,969,294 A | 10/1999 | Eberle et al. | |
| 5,971,626 A | 10/1999 | Knodell et al. | |
| 5,975,769 A | 11/1999 | Larson et al. | |
| 5,987,203 A | 11/1999 | Abel et al. | |
| 6,005,991 A | 12/1999 | Knasel | |
| 6,012,852 A | 1/2000 | Kadar-Kallen et al. | |
| 6,022,150 A | 2/2000 | Erdman et al. | |
| 6,027,252 A | 2/2000 | Erdman et al. | |
| 6,041,155 A | 3/2000 | Anderson et al. | |
| 6,044,193 A | 3/2000 | Szentesi et al. | |
| 6,061,492 A | 5/2000 | Strause et al. | |
| 6,076,975 A | 6/2000 | Roth | |
| 6,079,881 A | 6/2000 | Roth | |
| 6,097,872 A | 8/2000 | Kusuda et al. | |
| 6,149,315 A | 11/2000 | Stephenson | |
| 6,160,946 A | 12/2000 | Thompson et al. | |
| 6,167,183 A | 12/2000 | Swain | |
| 6,181,845 B1 | 1/2001 | Horsthuis et al. | |
| 6,188,687 B1 | 2/2001 | Mussman et al. | |
| 6,188,825 B1 | 2/2001 | Bandy et al. | |
| 6,208,779 B1 | 3/2001 | Rowlette, Sr. et al. | |
| 6,208,796 B1 | 3/2001 | Vigliaturo | |
| 6,215,938 B1 | 4/2001 | Reitmeier et al. | |
| 6,222,976 B1 | 4/2001 | Shahid | |
| 6,227,717 B1 | 5/2001 | Ott et al. | |
| 6,234,683 B1 | 5/2001 | Waldron et al. | |
| 6,236,795 B1 | 5/2001 | Rodgers | |
| 6,240,229 B1 | 5/2001 | Roth | |
| 6,256,443 B1 | 7/2001 | Uruno | |
| 6,269,213 B1 * | 7/2001 | Ohta | G02B 6/4452 385/135 |
| 6,269,214 B1 | 7/2001 | Naudin et al. | |
| 6,271,484 B1 | 8/2001 | Tokutsu | |

(56) References Cited

U.S. PATENT DOCUMENTS

| | | |
|---|---|---|
| 6,278,829 B1 | 8/2001 | BuAbbud et al. |
| 6,304,690 B1 | 10/2001 | Day |
| RE37,489 E | 1/2002 | Anton et al. |
| 6,347,888 B1 | 2/2002 | Puetz |
| 6,351,590 B1 | 2/2002 | Shahid |
| 6,352,374 B1 | 3/2002 | Selfridge et al. |
| 6,356,697 B1 | 3/2002 | Braga et al. |
| 6,360,050 B1 | 3/2002 | Moua et al. |
| 6,363,200 B1 | 3/2002 | Thompson et al. |
| 6,385,381 B1 | 5/2002 | Janus et al. |
| 6,411,767 B1 | 6/2002 | Burrous et al. |
| 6,424,781 B1 | 7/2002 | Puetz et al. |
| 6,425,694 B1 | 7/2002 | Szilagyi et al. |
| 6,431,762 B1 | 8/2002 | Taira et al. |
| 6,434,313 B1 | 8/2002 | Clapp, Jr. et al. |
| 6,452,925 B1 | 9/2002 | Sistanizadeh et al. |
| 6,453,033 B1 | 9/2002 | Little et al. |
| 6,464,402 B1 | 10/2002 | Andrews et al. |
| D466,087 S | 11/2002 | Cuny et al. |
| 6,480,487 B1 | 11/2002 | Wegleitner et al. |
| 6,480,661 B2 | 11/2002 | Kadar-Kallen et al. |
| 6,483,977 B2 | 11/2002 | Battey et al. |
| 6,493,480 B1 | 12/2002 | Lelic |
| 6,496,638 B1 | 12/2002 | Andersen |
| 6,496,640 B1 | 12/2002 | Harvey et al. |
| 6,499,609 B2 * | 12/2002 | Patriche ............... G02B 6/4455 211/175 |
| 6,504,988 B1 | 1/2003 | Trebesch et al. |
| 6,510,273 B2 | 1/2003 | Ali et al. |
| 6,526,210 B1 | 2/2003 | Harrison et al. |
| 6,532,332 B2 | 3/2003 | Solheid et al. |
| 6,535,682 B1 | 3/2003 | Puetz et al. |
| 6,537,106 B1 | 3/2003 | Follingstad |
| 6,539,147 B1 | 3/2003 | Mahony |
| 6,539,160 B2 | 3/2003 | Battey et al. |
| 6,542,688 B1 | 4/2003 | Battey et al. |
| 6,547,450 B2 | 4/2003 | Lampert |
| 6,554,485 B1 | 4/2003 | Beatty et al. |
| 6,556,763 B1 * | 4/2003 | Puetz ............... G02B 6/4452 385/135 |
| 6,573,451 B2 | 6/2003 | Komiya et al. |
| 6,577,595 B1 | 6/2003 | Counterman |
| 6,588,865 B2 * | 7/2003 | Caldwell, Jr. ........ A47B 49/00 312/283 |
| 6,591,051 B2 | 7/2003 | Solheid et al. |
| 6,594,434 B1 | 7/2003 | Davidson et al. |
| 6,597,670 B1 | 7/2003 | Tweedy et al. |
| 6,600,866 B2 | 7/2003 | Gatica et al. |
| 6,614,980 B1 | 9/2003 | Mahony |
| 6,619,853 B2 | 9/2003 | Grois et al. |
| 6,621,975 B2 | 9/2003 | Laporte et al. |
| 6,623,170 B2 | 9/2003 | Petrillo |
| 6,625,375 B1 | 9/2003 | Mahony |
| 6,631,237 B2 | 10/2003 | Knudsen et al. |
| RE38,311 E | 11/2003 | Wheeler |
| 6,648,376 B2 | 11/2003 | Christianson |
| 6,654,536 B2 | 11/2003 | Battey et al. |
| 6,661,961 B1 | 12/2003 | Allen et al. |
| 6,668,127 B1 | 12/2003 | Mahony |
| 6,688,780 B2 | 2/2004 | Duran |
| 6,690,862 B1 | 2/2004 | Rietveld |
| 6,690,867 B2 | 2/2004 | Melton et al. |
| 6,709,607 B2 | 3/2004 | Hibbs-Brenner et al. |
| 6,711,339 B2 | 3/2004 | Puetz et al. |
| 6,736,670 B2 | 5/2004 | Clark et al. |
| 6,755,574 B2 | 6/2004 | Fujiwara et al. |
| 6,760,530 B1 | 7/2004 | Mandry |
| 6,760,531 B1 | 7/2004 | Solheid et al. |
| 6,761,585 B2 | 7/2004 | Clark et al. |
| 6,763,166 B2 | 7/2004 | Yow, Jr. et al. |
| 6,764,221 B1 | 7/2004 | de Jong et al. |
| 6,768,860 B2 | 7/2004 | Liberty |
| 6,775,458 B2 | 8/2004 | Yow, Jr. et al. |
| 6,778,752 B2 | 8/2004 | Laporte et al. |
| 6,785,447 B2 | 8/2004 | Yoshimura et al. |
| 6,788,786 B1 | 9/2004 | Kessler et al. |
| 6,788,846 B2 | 9/2004 | Hileman et al. |
| 6,792,190 B2 | 9/2004 | Xin et al. |
| 6,792,191 B1 | 9/2004 | Clapp, Jr. et al. |
| 6,793,517 B2 | 9/2004 | Neer et al. |
| 6,796,717 B2 | 9/2004 | Petrillo |
| 6,801,680 B2 | 10/2004 | Lin |
| 6,810,193 B1 | 10/2004 | Müller |
| 6,810,194 B2 | 10/2004 | Griffiths et al. |
| 6,815,612 B2 | 11/2004 | Bloodworth et al. |
| 6,819,821 B2 | 11/2004 | Lacey et al. |
| 6,830,159 B2 * | 12/2004 | Caldwell, Jr. .......... A47B 49/00 220/345.1 |
| 6,845,207 B2 | 1/2005 | Schray |
| 6,845,208 B2 | 1/2005 | Thibault et al. |
| 6,850,671 B2 | 2/2005 | Carnevale et al. |
| 6,850,685 B2 | 2/2005 | Tinucci et al. |
| 6,853,795 B2 | 2/2005 | Dagley et al. |
| 6,865,330 B2 | 3/2005 | Lecomte et al. |
| 6,870,734 B2 | 3/2005 | Mertesdorf et al. |
| 6,888,069 B1 | 5/2005 | Chen et al. |
| 6,901,200 B2 | 5/2005 | Schray |
| 6,905,257 B2 | 6/2005 | Eichenberger et al. |
| 6,909,833 B2 | 6/2005 | Henschel et al. |
| 6,912,349 B2 | 6/2005 | Clark et al. |
| 6,916,199 B2 | 7/2005 | Follingstad |
| 6,920,213 B2 | 7/2005 | Pershan |
| 6,920,274 B2 | 7/2005 | Rapp et al. |
| 6,925,241 B2 * | 8/2005 | Bohle ................. G02B 6/4455 385/134 |
| 6,934,457 B2 | 8/2005 | Vincent et al. |
| 6,937,800 B2 | 8/2005 | Cote |
| 6,950,593 B2 | 9/2005 | Hodge et al. |
| 6,951,374 B2 * | 10/2005 | Swenson ............... A47B 49/00 312/283 |
| 6,959,139 B2 | 10/2005 | Erwin et al. |
| 6,968,111 B2 | 11/2005 | Trebesch et al. |
| 6,973,251 B2 * | 12/2005 | Morellec ............. G02B 6/3897 385/135 |
| 6,980,725 B1 | 12/2005 | Swieconek |
| 6,983,095 B2 | 1/2006 | Reagan et al. |
| H2144 H | 2/2006 | Baechtle et al. |
| 7,006,748 B2 | 2/2006 | Dagley et al. |
| 7,020,359 B2 | 3/2006 | Mayer |
| 7,029,322 B2 | 4/2006 | Ernst et al. |
| 7,058,245 B2 | 6/2006 | Farahi |
| 7,066,762 B2 | 6/2006 | Neer et al. |
| 7,066,771 B2 | 6/2006 | Clark et al. |
| 7,068,907 B2 | 6/2006 | Schray |
| 7,079,744 B2 | 7/2006 | Douglas et al. |
| 7,086,539 B2 | 8/2006 | Knudsen et al. |
| 7,088,899 B2 | 8/2006 | Reagan et al. |
| 7,090,084 B2 | 8/2006 | Knudsen et al. |
| 7,092,592 B2 | 8/2006 | Verhagen et al. |
| 7,094,095 B1 | 8/2006 | Caveney |
| 7,102,884 B2 | 9/2006 | Mertesdorf et al. |
| 7,103,255 B2 | 9/2006 | Reagan et al. |
| 7,113,686 B2 | 9/2006 | Bellekens et al. |
| 7,116,777 B2 | 10/2006 | Knudsen et al. |
| 7,130,498 B2 | 10/2006 | Meis et al. |
| 7,139,452 B2 | 11/2006 | Mayer et al. |
| 7,139,456 B2 | 11/2006 | Sasaki et al. |
| 7,139,461 B2 | 11/2006 | Puetz et al. |
| 7,142,764 B2 | 11/2006 | Allen et al. |
| 7,142,765 B2 | 11/2006 | Rapp et al. |
| 7,146,089 B2 | 12/2006 | Reagan et al. |
| 7,149,398 B2 | 12/2006 | Solheid et al. |
| 7,171,102 B2 | 1/2007 | Reagan et al. |
| 7,179,119 B2 | 2/2007 | Follingstad |
| 7,186,032 B1 | 3/2007 | Stevens et al. |
| 7,194,181 B2 | 3/2007 | Holmberg et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,712 B2 | 6/2007 | Arellano |
| 7,233,731 B2 | 6/2007 | Solheid et al. |
| 7,241,182 B2 | 7/2007 | Clark et al. |
| 7,244,144 B2 | 7/2007 | Follingstad |
| 7,277,620 B2 | 10/2007 | Vongseng et al. |

(56) References Cited

U.S. PATENT DOCUMENTS

| | | | |
|---|---|---|---|
| 7,302,153 B2 | 11/2007 | Thom | |
| 7,312,396 B1* | 12/2007 | Gorman | H02G 3/125 |
| | | | 174/480 |
| 7,330,546 B2 | 2/2008 | Kessler et al. | |
| 7,333,707 B2 | 2/2008 | Puetz et al. | |
| 7,335,056 B1 | 2/2008 | Clark et al. | |
| 7,346,254 B2 | 3/2008 | Kramer et al. | |
| 7,357,667 B2 | 4/2008 | Clark et al. | |
| 7,367,823 B2 | 5/2008 | Rapp et al. | |
| 7,369,741 B2 | 5/2008 | Reagan et al. | |
| 7,376,321 B2 | 5/2008 | Bolster et al. | |
| 7,376,322 B2 | 5/2008 | Zimmel et al. | |
| 7,376,323 B2 | 5/2008 | Zimmel | |
| 7,377,697 B2 | 5/2008 | Kahle et al. | |
| 7,391,952 B1 | 6/2008 | Ugolini et al. | |
| 7,400,813 B2 | 7/2008 | Zimmel | |
| 7,400,816 B2 | 7/2008 | Reagan et al. | |
| 7,406,240 B2 | 7/2008 | Murano | |
| 7,407,330 B2 | 8/2008 | Smith et al. | |
| 7,408,769 B2 | 8/2008 | Mertesdorf et al. | |
| 7,412,147 B2 | 8/2008 | Scadden | |
| 7,416,349 B2 | 8/2008 | Kramer | |
| 7,418,181 B2 | 8/2008 | Zimmel et al. | |
| 7,433,915 B2 | 10/2008 | Edwards et al. | |
| 7,455,548 B2 | 11/2008 | Clark et al. | |
| 7,457,503 B2 | 11/2008 | Solheid et al. | |
| 7,460,757 B2 | 12/2008 | Hoehne et al. | |
| 7,471,869 B2 | 12/2008 | Reagan et al. | |
| 7,493,002 B2 | 2/2009 | Coburn et al. | |
| 7,496,268 B2 | 2/2009 | Escoto et al. | |
| 7,515,805 B2 | 4/2009 | Vongseng et al. | |
| 7,519,259 B2 | 4/2009 | Vongseng et al. | |
| 7,534,135 B2 | 5/2009 | Follingstad | |
| 7,544,090 B2 | 6/2009 | Follingstad | |
| 7,553,091 B2 | 6/2009 | McColloch | |
| 7,555,193 B2 | 6/2009 | Rapp et al. | |
| 7,623,749 B2 | 11/2009 | Reagan et al. | |
| 7,627,204 B1 | 12/2009 | Deane | |
| 7,646,958 B1 | 1/2010 | Reagan et al. | |
| 7,668,427 B2 | 2/2010 | Register | |
| 7,686,658 B2 | 3/2010 | Clark et al. | |
| 7,689,089 B2 | 3/2010 | Wagner et al. | |
| 7,706,656 B2 | 4/2010 | Zimmel | |
| 7,722,261 B2 | 5/2010 | Kadar-Kallen et al. | |
| 7,738,755 B2 | 6/2010 | Shioda | |
| 7,738,760 B2 | 6/2010 | Fredrickson et al. | |
| 7,747,125 B1 | 6/2010 | Lee et al. | |
| RE41,460 E | 7/2010 | Wheeler | |
| 7,751,674 B2 | 7/2010 | Hill | |
| 7,756,380 B2 | 7/2010 | Ruiz et al. | |
| 7,775,725 B2 | 8/2010 | Grinderslev | |
| 7,805,043 B2 | 9/2010 | Puetz et al. | |
| 7,809,232 B2 | 10/2010 | Reagan et al. | |
| 7,809,233 B2 | 10/2010 | Smith et al. | |
| 7,809,234 B2 | 10/2010 | Smith et al. | |
| 7,809,235 B2 | 10/2010 | Reagan et al. | |
| 7,822,313 B2 | 10/2010 | Rapp et al. | |
| 7,826,706 B2 | 11/2010 | Vongseng et al. | |
| 7,841,775 B2 | 11/2010 | Smith et al. | |
| 7,844,159 B2 | 11/2010 | Solheid et al. | |
| 7,844,161 B2 | 11/2010 | Reagan et al. | |
| 7,856,166 B2* | 12/2010 | Biribuze | G02B 6/4452 |
| | | | 385/134 |
| 7,873,255 B2 | 1/2011 | Reagan et al. | |
| 7,889,961 B2 | 2/2011 | Cote et al. | |
| 7,899,295 B2 | 3/2011 | Rapp et al. | |
| 7,934,948 B2 | 5/2011 | Follingstad | |
| 7,942,004 B2 | 5/2011 | Hodder | |
| 7,945,138 B2 | 5/2011 | Hill et al. | |
| 7,952,023 B2 | 5/2011 | Caveney et al. | |
| 7,961,999 B2 | 6/2011 | Frohlich et al. | |
| 7,978,951 B2 | 7/2011 | Krampotich et al. | |
| 7,983,521 B2 | 7/2011 | Rapp et al. | |
| 8,019,192 B2 | 9/2011 | Puetz et al. | |
| 8,041,221 B2 | 10/2011 | Elberbaum | |
| 8,059,932 B2 | 11/2011 | Hill et al. | |
| 8,078,017 B2 | 12/2011 | Kodama et al. | |
| 8,085,472 B2 | 12/2011 | Kadar-Kallen | |
| 8,139,913 B2 | 3/2012 | Bolster et al. | |
| 8,195,022 B2 | 6/2012 | Coburn et al. | |
| 8,251,591 B2 | 8/2012 | Barnes et al. | |
| 8,280,205 B2 | 10/2012 | Erdman et al. | |
| 8,285,104 B2 | 10/2012 | Davis et al. | |
| 8,313,249 B2 | 11/2012 | Gurreri et al. | |
| 8,315,498 B2 | 11/2012 | Redmann et al. | |
| 8,328,026 B2* | 12/2012 | Boduch | H05K 7/1425 |
| | | | 211/26 |
| 8,331,752 B2* | 12/2012 | Biribuze | G02B 6/4452 |
| | | | 385/135 |
| 8,358,900 B2 | 1/2013 | Rapp et al. | |
| 8,374,477 B2 | 2/2013 | Hill | |
| 8,406,587 B2 | 3/2013 | Mudd et al. | |
| 8,417,074 B2 | 4/2013 | Nhep et al. | |
| 8,422,847 B2 | 4/2013 | Kowalczyk et al. | |
| 8,428,418 B2 | 4/2013 | Smrha | |
| 8,457,458 B2 | 6/2013 | Kadar-Kallen et al. | |
| 8,494,329 B2 | 7/2013 | Nhep et al. | |
| 8,559,785 B2 | 10/2013 | Barlowe et al. | |
| 8,582,299 B1* | 11/2013 | Phillips | H05K 7/1489 |
| | | | 361/724 |
| 8,588,566 B2 | 11/2013 | Matsuyama et al. | |
| 8,600,208 B2 | 12/2013 | Badar et al. | |
| 8,649,648 B2 | 2/2014 | Coburn et al. | |
| 8,660,397 B2 | 2/2014 | Giraud et al. | |
| 8,690,593 B2 | 4/2014 | Anderson et al. | |
| 8,712,206 B2 | 4/2014 | Cooke et al. | |
| 8,774,584 B2 | 7/2014 | Kim et al. | |
| 9,144,901 B2 | 9/2015 | Yang et al. | |
| 2001/0017508 A1* | 8/2001 | Caldwell, Jr. | A47B 49/00 |
| | | | 312/326 |
| 2002/0179547 A1* | 12/2002 | Patriche | G02B 6/4455 |
| | | | 211/26 |
| 2002/0181893 A1 | 12/2002 | White et al. | |
| 2002/0181922 A1 | 12/2002 | Xin et al. | |
| 2003/0034718 A1* | 2/2003 | Swenson | A47B 49/00 |
| | | | 312/326 |
| 2003/0038569 A1* | 2/2003 | Caldwell, Jr. | A47B 49/00 |
| | | | 312/285 |
| 2003/0128951 A1* | 7/2003 | Lecomte | G02B 6/3885 |
| | | | 385/135 |
| 2003/0174996 A1 | 9/2003 | Henschel et al. | |
| 2003/0182015 A1 | 9/2003 | Domaille et al. | |
| 2004/0136638 A1 | 7/2004 | Baechtle et al. | |
| 2004/0136677 A1* | 7/2004 | Morellec | G02B 6/3897 |
| | | | 385/135 |
| 2004/0172492 A1 | 9/2004 | Farnworth et al. | |
| 2004/0175089 A1* | 9/2004 | Dagley | G02B 6/4452 |
| | | | 385/135 |
| 2004/0175090 A1 | 9/2004 | Vastmans et al. | |
| 2005/0003697 A1 | 1/2005 | Neer et al. | |
| 2005/0058421 A1 | 3/2005 | Dagley et al. | |
| 2005/0058425 A1 | 3/2005 | Berini et al. | |
| 2005/0100301 A1 | 5/2005 | Solheid | |
| 2006/0210222 A1 | 9/2006 | Watte et al. | |
| 2006/0275008 A1* | 12/2006 | Xin | G02B 6/4452 |
| | | | 385/135 |
| 2007/0003204 A1 | 1/2007 | Makrides-Saravanos et al. | |
| 2007/0230863 A1 | 10/2007 | Fukuda et al. | |
| 2008/0079341 A1 | 4/2008 | Anderson et al. | |
| 2008/0217962 A1* | 9/2008 | Boduch | H05K 7/1425 |
| | | | 296/204 |
| 2009/0067800 A1 | 3/2009 | Vazquez et al. | |
| 2009/0067802 A1 | 3/2009 | Hoehne et al. | |
| 2009/0068866 A1* | 3/2009 | Sinclair | H01R 25/14 |
| | | | 439/110 |
| 2009/0068901 A1* | 3/2009 | Nad | H01R 9/26 |
| | | | 439/716 |
| 2009/0097813 A1 | 4/2009 | Hill | |
| 2009/0305538 A1 | 12/2009 | Caveney et al. | |
| 2010/0027952 A1 | 2/2010 | Ruiz et al. | |
| 2010/0054681 A1* | 3/2010 | Biribuze | G02B 6/4452 |
| | | | 385/135 |
| 2010/0316335 A1 | 12/2010 | Furuyama | |

(56) References Cited

U.S. PATENT DOCUMENTS

| | | |
|---|---|---|
| 2010/0322576 A1 | 12/2010 | Rhoney et al. |
| 2010/0322578 A1 | 12/2010 | Cooke et al. |
| 2011/0062101 A1 | 3/2011 | Todd, Jr. |
| 2011/0065909 A1 | 3/2011 | Lange et al. |
| 2011/0085776 A1* | 4/2011 | Biribuze .............. G02B 6/4452 385/135 |
| 2011/0129186 A1 | 6/2011 | Lewallen et al. |
| 2011/0182558 A1 | 7/2011 | Garcia et al. |
| 2011/0211799 A1 | 9/2011 | Conner et al. |
| 2011/0217016 A1 | 9/2011 | Mullsteff |
| 2011/0222829 A1 | 9/2011 | Loeffelholz et al. |
| 2011/0262077 A1 | 10/2011 | Anderson et al. |
| 2011/0267794 A1 | 11/2011 | Anderson et al. |
| 2011/0268404 A1 | 11/2011 | Cote et al. |
| 2011/0268408 A1 | 11/2011 | Giraud et al. |
| 2011/0268410 A1 | 11/2011 | Giraud et al. |
| 2011/0268412 A1 | 11/2011 | Giraud et al. |
| 2011/0268414 A1 | 11/2011 | Giraud et al. |
| 2011/0286712 A1 | 11/2011 | Puetz et al. |
| 2011/0317974 A1 | 12/2011 | Krampotich et al. |
| 2012/0008900 A1 | 1/2012 | Schneider |
| 2012/0014645 A1 | 1/2012 | Kadar-Kallen |
| 2012/0049017 A1 | 3/2012 | Murano et al. |
| 2012/0051706 A1 | 3/2012 | Van Geffen et al. |
| 2012/0162910 A1* | 6/2012 | Jai ........................ H05K 7/1492 361/679.58 |
| 2012/0263415 A1 | 10/2012 | Tan et al. |
| 2012/0301098 A1 | 11/2012 | Benedetto et al. |
| 2012/0321269 A1 | 12/2012 | Kramer et al. |
| 2013/0039628 A1 | 2/2013 | Kim et al. |
| 2013/0064495 A1 | 3/2013 | Eberle, Jr. |
| 2013/0064506 A1 | 3/2013 | Eberle et al. |
| 2013/0077913 A1 | 3/2013 | Schneider et al. |
| 2013/0089292 A1 | 4/2013 | Ott et al. |
| 2013/0287356 A1 | 10/2013 | Solheid et al. |
| 2014/0042111 A1 | 2/2014 | Yang et al. |

FOREIGN PATENT DOCUMENTS

| | | |
|---|---|---|
| CN | 2426610 Y | 4/2001 |
| DE | 27 35 106 A1 | 2/1979 |
| DE | 33 08 682 A1 | 9/1984 |
| DE | 42 07 531 A1 | 9/1992 |
| DE | 42 29 510 A1 | 3/1994 |
| EP | 0 146 478 A2 | 6/1985 |
| EP | 0 149 250 A2 | 7/1985 |
| EP | 0 196 102 A2 | 10/1986 |
| EP | 0 211 208 A1 | 2/1987 |
| EP | 0 293 183 A2 | 11/1988 |
| EP | 0 349 290 A1 | 1/1990 |
| EP | 0 406 151 A2 | 1/1991 |
| EP | 0 479 226 A1 | 4/1992 |
| EP | 0 196 102 B1 | 3/1993 |
| EP | 0 538 164 A1 | 4/1993 |
| EP | 0 585 809 A1 | 3/1994 |
| EP | 0 697 610 A1 | 2/1996 |
| EP | 0 743 701 A2 | 11/1996 |
| EP | 0 788 002 A1 | 8/1997 |
| EP | 0 871 047 A1 | 10/1998 |
| EP | 0 563 995 B1 | 10/1999 |
| EP | 0 975 180 A1 | 1/2000 |
| EP | 1 045 267 A1 | 10/2000 |
| FR | 2 531 576 A1 | 2/1984 |
| FR | 2 587 127 A1 | 3/1987 |
| JP | 59-74523 | 4/1984 |
| JP | 60-169811 | 9/1985 |
| JP | 61-55607 | 3/1986 |
| JP | 61-90104 | 5/1986 |
| JP | 63-229409 | 9/1988 |
| JP | 06199090 | 7/1994 |
| JP | 1144266 S | 6/2002 |
| JP | 3307618 B2 | 7/2002 |
| JP | 3761762 B2 | 3/2006 |
| WO | WO 91/10927 | 7/1991 |
| WO | WO 94/17534 | 8/1994 |
| WO | WO 95/20175 | 7/1995 |
| WO | WO 98/53347 | 11/1998 |
| WO | WO 99/27404 | 6/1999 |
| WO | WO 00/05611 | 2/2000 |
| WO | WO 00/07053 | 2/2000 |
| WO | WO 00/52504 | 9/2000 |
| WO | WO 00/75706 | 12/2000 |
| WO | WO 01/75495 | 10/2001 |
| WO | WO 02/21182 | 3/2002 |
| WO | WO 02/103429 | 12/2002 |
| WO | WO 03/021312 | 3/2003 |
| WO | WO 03/093883 | 11/2003 |
| WO | WO 2008/089192 | 7/2008 |
| WO | WO 2009/120280 | 10/2009 |

OTHER PUBLICATIONS

International Search Report and Written Opinion for PCT/US2012/059035 dated Mar. 29, 2013.

U.S. Appl. No. 61/789,572, filed Mar. 15, 2013.

ADC Telecommunications, Inc., brochure entitled "ADC OMX 600 Optical Distribution Frame Solution," Publication No. 856, 8 pages (Feb. 2000).

ADC Telecommunications, Inc., brochure entitled "OMX™ 600 Optical Distribution Frame," Publication No. 854, front cover, table of contents, pp. 1-13 (Apr. 2000) (15 pages total).

21 photographs showing what AFL Telecommunications LLC purports to be the ECOE cabinet referenced in the Prior art statement and the Supplemental prior art statement listed above. AFL Telecommunications LLC asserts the cabinet was on sale as early as 2001.

24 photos of LambdaUnite® Blank Card; "LambdaUnite® MultiService Switch (MSS)" brochure (2003); and "Lucent's LambdaUnite® Busts Out" official release (Jan. 29, 2002) (33 pages total).

ADC Telecommunications, Inc., brochure entitled "Fiber Cable Management Products, Second Edition," Publication No. 804, 144 pages (Oct. 1995).

ADC Telecommunications, Inc., brochure entitled "FL2000 Products," Publication No. 803, 51 pages (Nov. 1996).

ADC Telecommunications, Inc., brochure entitled "Next Generation Frame (NGF) Product Family Ordering Guide," Publication No. 820, 22 pages (Oct. 1998).

ADC Telecommunications, Inc., brochure entitled "Value-Added Module (VAM) System: Monitor, Splitter, WDM and CWDM Modules and Chassis for Switching Office, Central Exchange and Headend Applications, 1$^{st}$ edition," Part No. 101663BE, 36 pages (Feb. 2008).

ADC Telecommunications, Inc., "Value-Added Module (VAM) System—Monitor, Splitter, WDM/CWDM/DWDM Modules and Chassis—5$^{th}$ Edition," 32 Pages (Oct. 2009).

ADC Telecommunications, Inc., 600 mm Products, Value-Added Module System, Publication No. 100571, pp. 53-78 (Oct. 2003) (26 pages total).

ADC Telecommunications, Inc., brochure entitled "Value-Added Module System," Publication No. 891, 29 pages (Apr. 2000).

ADC Telecommunications, Inc., brochure entitled "Value-Added Module System: Optical Distribution Frame (OMX™ 600)," Publication No. 891-OMX, 11 pages (Jan. 2002).

ADC Telecommunications, Inc., brochure entitled "Fiber Management Tray: 2 Rack Unit (2 RU) Style FMT-G Series," Publication No. 1258896, 8 pages (Mar. 2003).

ADC Telecommunications, Inc., FMT Micro Value Added Monitor Module Configuration Scheme Installation drawings having drawing No. 1257196, 2 pages (Feb. 6, 2003).

ADC Telecommunications, Inc., "Mini VAM Connector Cleaning Instructions," ADCP-90-412, Issue 3, 8 pages (Sep. 2002).

ADC Telecommunications, Inc., Mini VAM Splitter Mod, Installation Drawings having drawing No. 1128185, 2 pages (Mar. 14, 2001).

ADC Telecommunications, Inc., "Next Generation Frame (NGF) Product Tour", Value Added Modules (VAMs), Copyright 2003, 1 page, (admitted as offered for sale as of Apr. 25, 2006).

(56) References Cited

OTHER PUBLICATIONS

ADC Telecommunications, Inc., brochure entitled "Fiber Panel Products, Second Edition," front cover, Table of Contents, and pp. 1-111, Publication No. 846 (Jul. 1996) (116 pages total).

ADC Telecommunications, Inc., "6th Edition of Next Generation Frame (NGF) Product Family Ordering Guide," front cover, Table of Contents, pp. 1-41, and back cover, Publication No. 820 (revised Feb. 2003) (44 pages total).

ADC Telecommunications, Inc., brochure entitled "Fiber Optic Cable Assemblies and Accessories," front cover, Table of Contents, pp. 1-23, and back cover, Item No. 100300 (revised Apr. 2003) (26 pages total).

ADC Telecommunications, Inc., brochure entitled "Next Generation Frame (NGF) Product Family," Publication No. 832, 8 pages, (Dec. 2000).

ADC Telecommunications, Inc., brochure entitled "Secure Fiber Entrance Terminal (SFET)," front cover, pp. 2-7, and back cover, Item No. 1005 (revised May 1998) (8 pages total).

ADC Telecommunications, Inc., brochure entitled "Outside Plant, Fiber Cross-Connect Solutions," front cover, Table of Contents, pp. 1-48, and back cover, Item No. 1047 (Jun. 2002).

AMP Inc. catalog entitled "Fiber Optic Products," front and back covers and p. 59, (© 1991) (4 pages total).

ADC Telecommunications, Inc., Assembly reference drawings having drawing No. 1067101, 8 pages (Aug. 17, 1999).

AT&T Network Systems, catalog entitled "Fiber Optic Products Innovation for wide ranging applications," front and back covers and pp. 6-1 through 6-16 (Feb. 1995) (18 pages total).

AT&T Network Systems, Product Bulletin, "High Density Interconnect System (HDIC)," 2987D-DLH-7/89, Issue 2, 4 pages (Copyright 1989).

ATI Optique Catalog, ATI Optique, division of ATI Electronique, Version 2.6, released Mar. 27, 2002 (50 pages).

Bockstaele et al., "A scalable parallel optical interconnect family," IO Overview Paper—Apr. 2004.

Amphenol Corp., brochure entitled "Amphenol® 954 Series one piece SC Connector," F122-00311, Issue 1, 2 pages (Aug. 1990).

ADC Telecommunications, Inc., Connectorized splitter drawings having drawing No. 1067961, 2 pages (Aug. 18, 1999).

Alcoa Fujikura Ltd., brochure entitled "Couplers: Couplers WDMS Packaging,", 5 pages (copyright 2000).

ADC Telecommunications, Inc., Fiber distribution drawings having drawing No. 1069967, 2 pages (Aug. 17, 1999).

FONS Corporation, MDC Series Rack or Wall Mount Enclosures product sheet, 3 pages (2002).

FONS Corporation, Modular Distribution Cabinets Rack Mount Enclosures, Model MDC-7, product sheet, 2 pages (2005).

FONS Corporation's Technical Drawing No. 11669, Rev. D, of Distribution Cabinet Assembly MFDC-7, 1 page (Nov. 2004).

Grimes, Gary J., "Applications of Parallel Optical Interconnects," Lasers and Meeting, Nov. 18-21, 1996, vol. 2, pp. 6-7. Electro-Optics Society Annual.

Hasegawa et al., "100GHz-48CH Athermal AWG with a Novel Temperature Insensitive Principle," National Fiber Optics Engineers Conference, 2003 Technical Proceedings, pp. 801-808.

Hirose Electric Co., Ltd., catalog entitled "Optical Fibre Connectors," Catalog No. O.F. (9) 3K, front and back covers and pp. 16, 17 and 49 (Mar. 1991) (5 pages total).

ADC Telecommunications, Inc., Installation drawings having drawing No. 1069965, 3 pages (Aug. 14, 1999).

Corning Cable Systems, "Installation Instructions for 12-position Splice Protector Insert," SRP-001-276, Issue 4, 1 page (Jul. 2001).

International Standard, "Fiber optic connector interfaces—Part 4-1: Type SC connector family—Simplified receptacle SC-PC connecter interfaces," Copyright IEC 61754-4-1, First edition, 9 pages (Jan. 2003).

Iwano et al., "MU-type Optical Fiber Connector System," *NTT Review*, vol. 9, No. 2, pp. 63-71 (Mar. 1997).

Corning Cable Systems, "Jumper Routing Procedure for Enhanced Management Frame," SRP-003-599, Issue 2, 4 pages (Apr. 2002).

Nexans, "Cross-Connect Cabinet III: Plastic Watertight Cabinet for FTTH Applications," 2 pages (Oct. 2002).

Nexans, "Cross-Connect Cabinet V: Metallic Watertight Cabinet for FTTH Applications," 2 pages (Oct. 2002).

Northern Telecom Bulletin #91-004, Issue #2, 16 pages (May 1991).

NTT International, brochure entitled "Fiber Termination Module (FTM) & Premises Optical Distribution Cabinets (PODC)," 3 pages, undated.

"Optical fiber coupler review," Manufacturing Group at the Optoelectronics Division, Technical Report 2001, Products Presentation, showing Sumitomo Osaka Cement Co. Ltd's Optical Coupler (pp. 41-42).

Precision Mechanical, in Chinese with English Translation, 5 pages (publicly known at least as early as Aug. 2002).

Preface to the book "Structure, Installation, Connection and Protection of Communication Optical Fiber Cable," in Chinese with English Translation, 14 pages (Mar. 1992).

Schneider et al., "Fibre Optic Circuits," TechCon 2011 (10 pages).

Shahid et al., "Flexible High Density Optical Circuits," National Fiber Optic Engineers Conference, 2001 Technical Proceedings.

Sugita et al., "SC-Type Single-Mode Optical Fiber Connectors," *Journal of Lightwave Technology*, vol. 7, No. 11, pp. 1689-1696 (Nov. 1989).

Tachikura et al., "Newly Developed Optical Fiber Distribution System and Cable Management in Central Office," International Wire & Cable Symposium, Proceedings of the 50th IWCS, pp. 98-105, undated.

\* cited by examiner

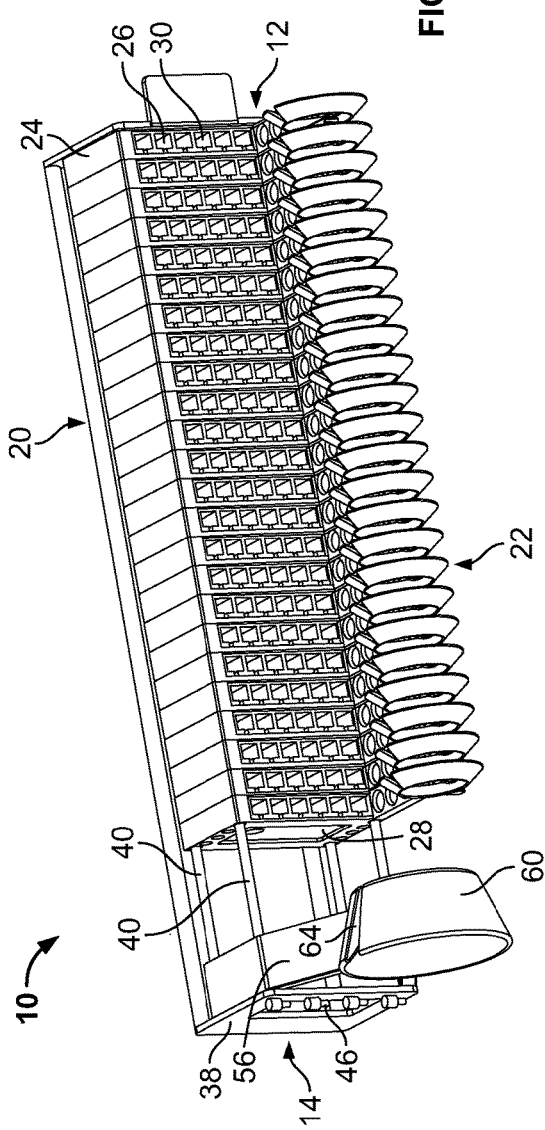
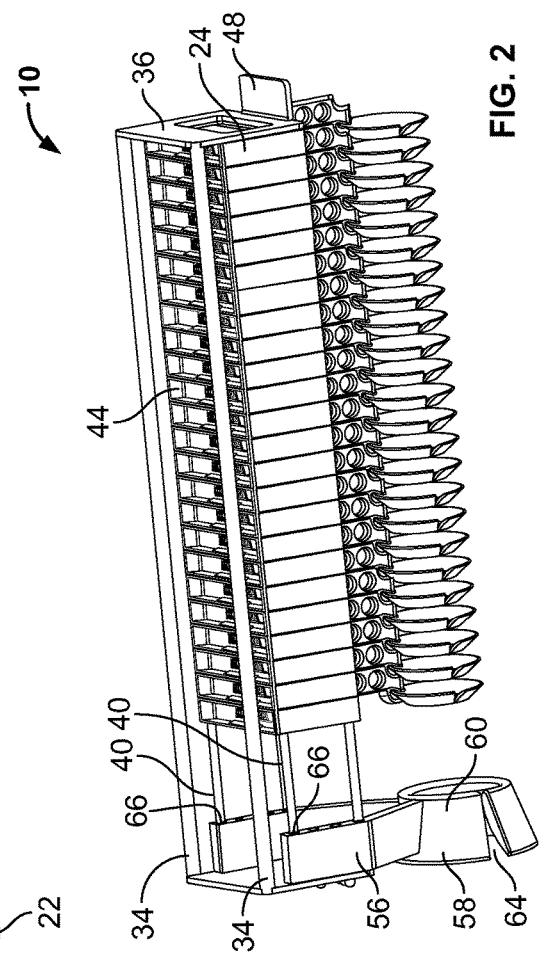

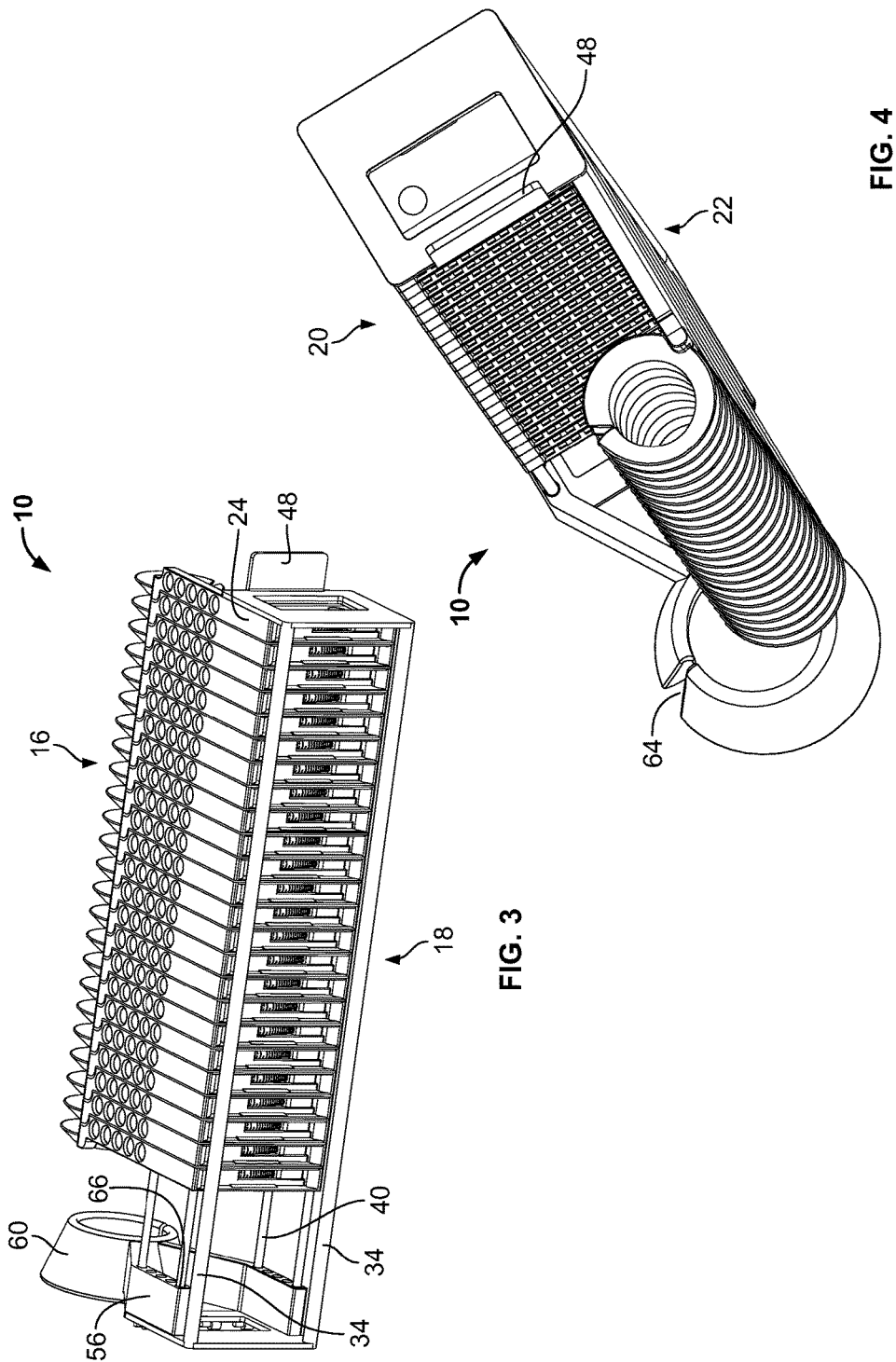

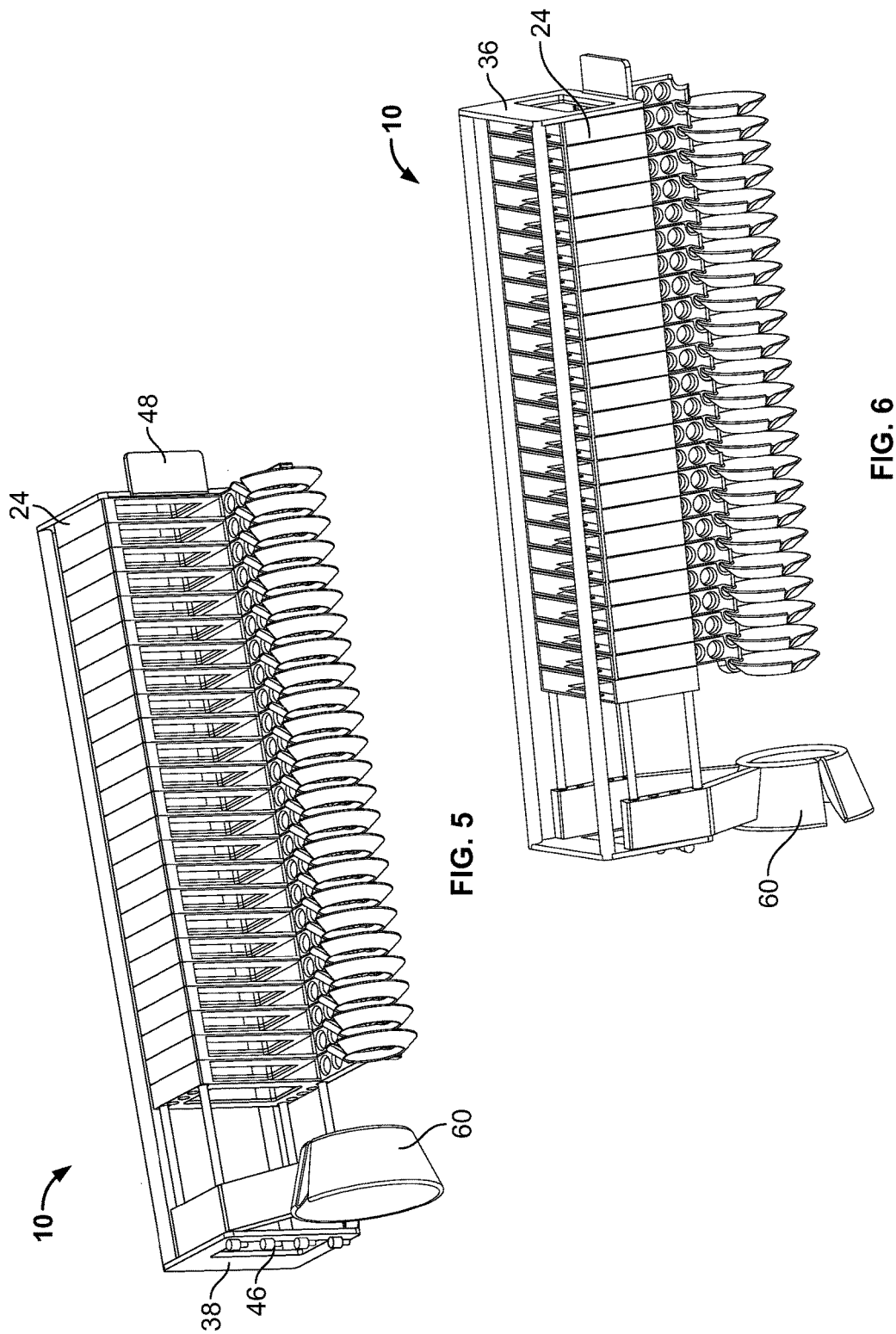

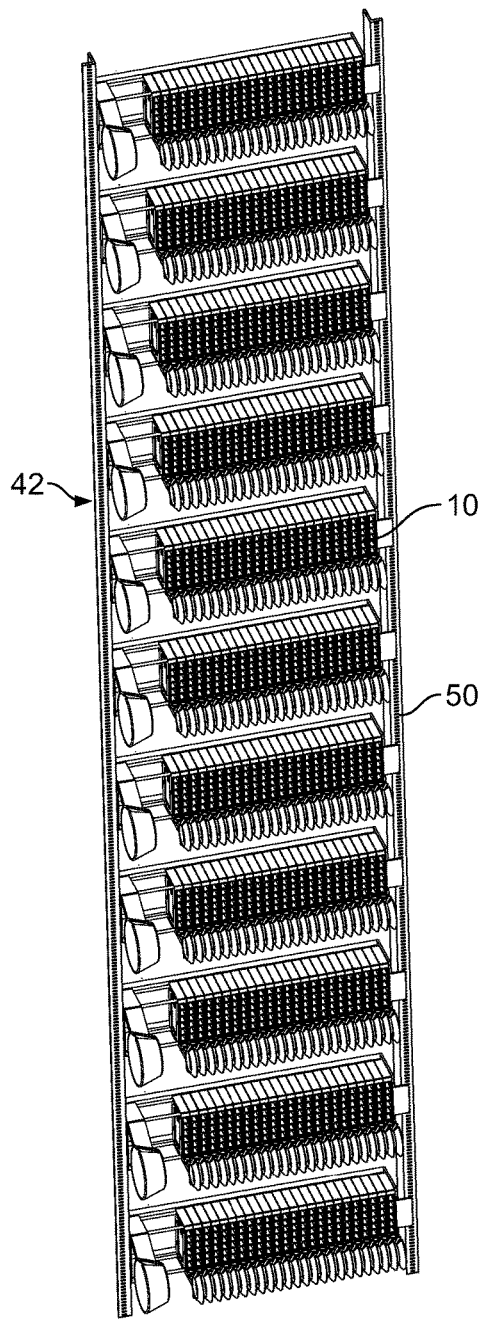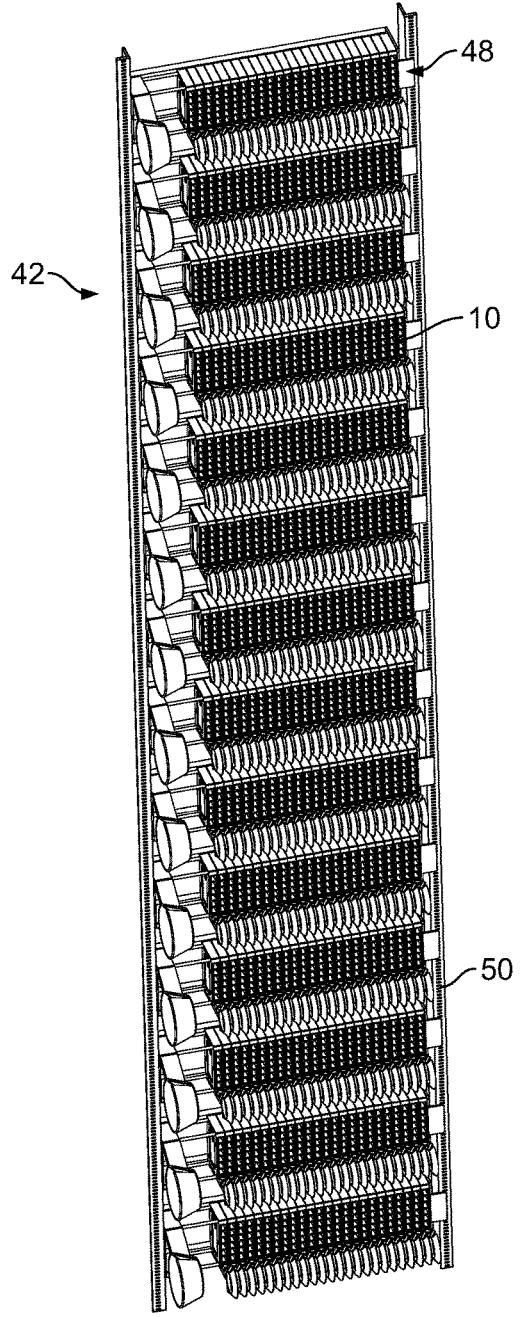
FIG. 13
FIG. 14

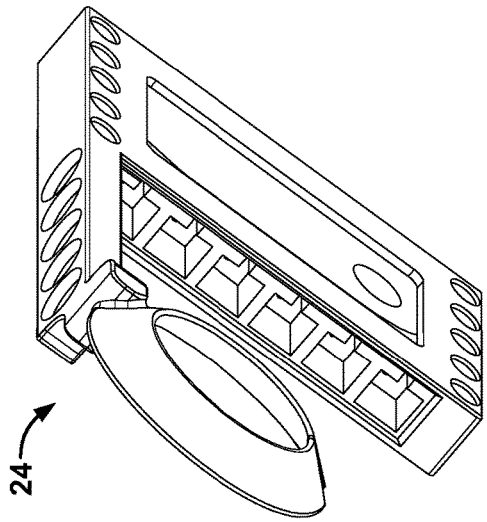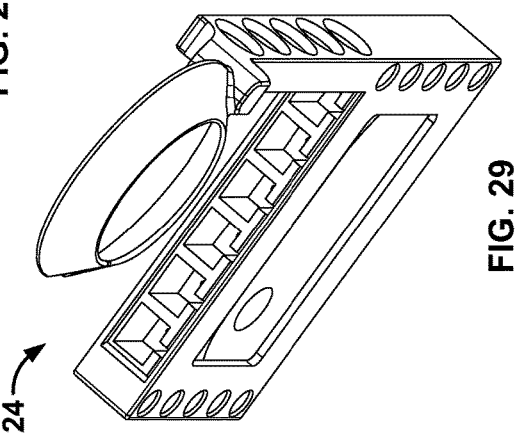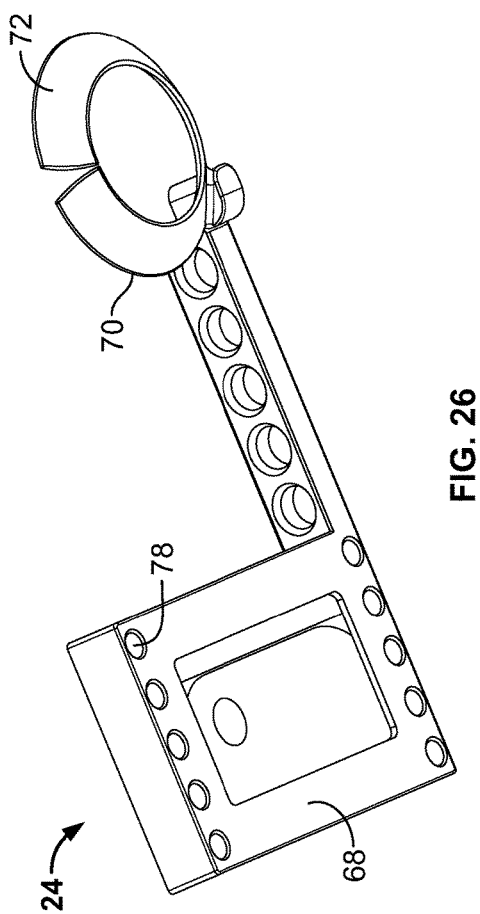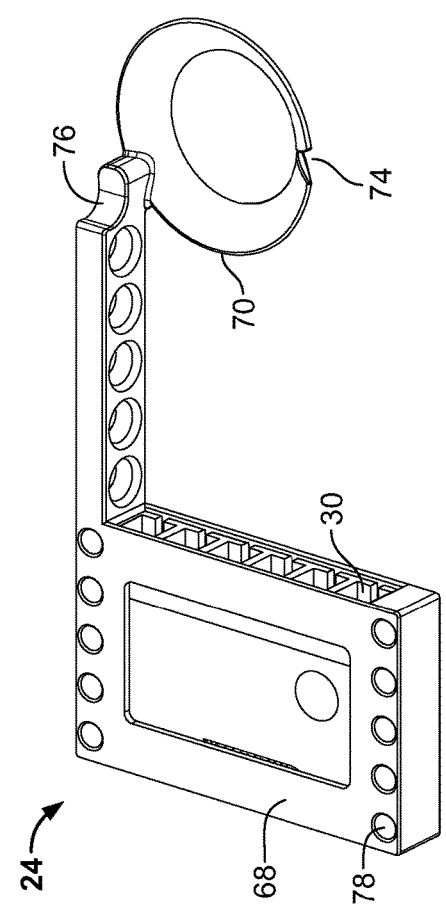

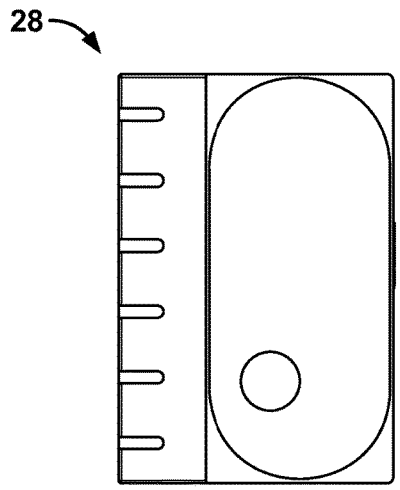
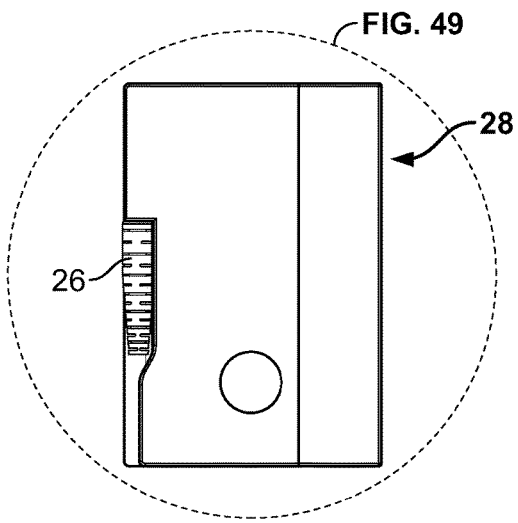
FIG. 47  FIG. 48
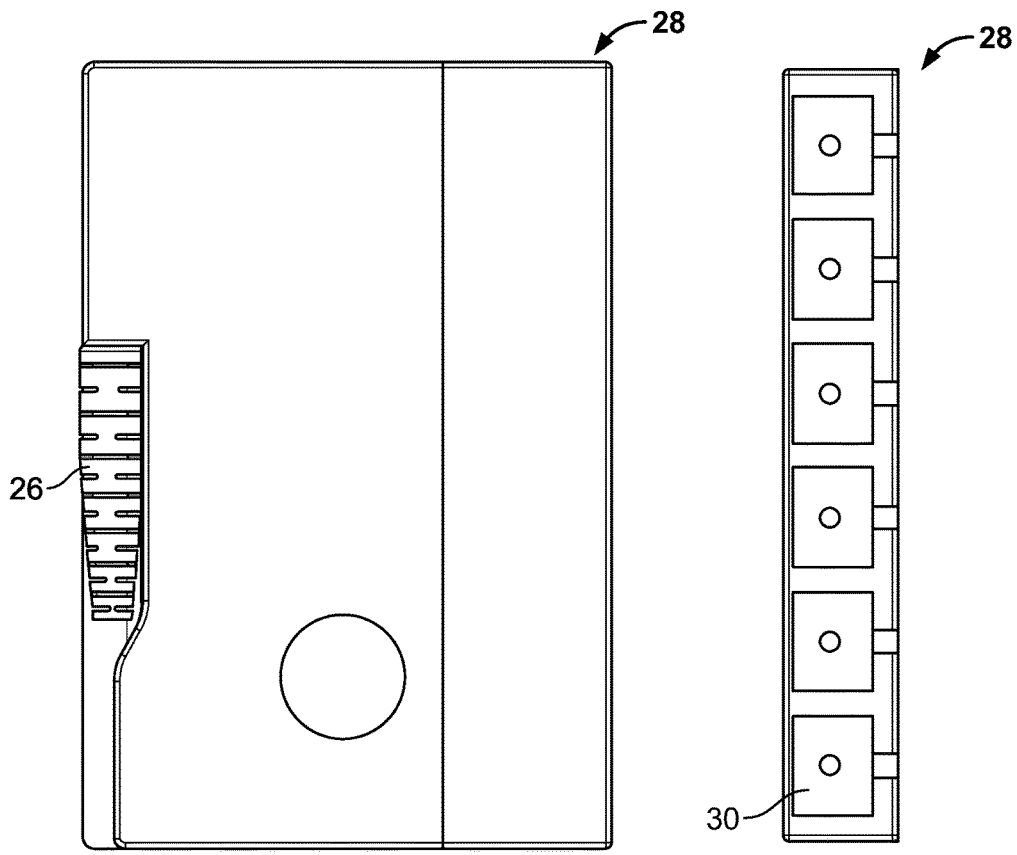
FIG. 49  FIG. 50

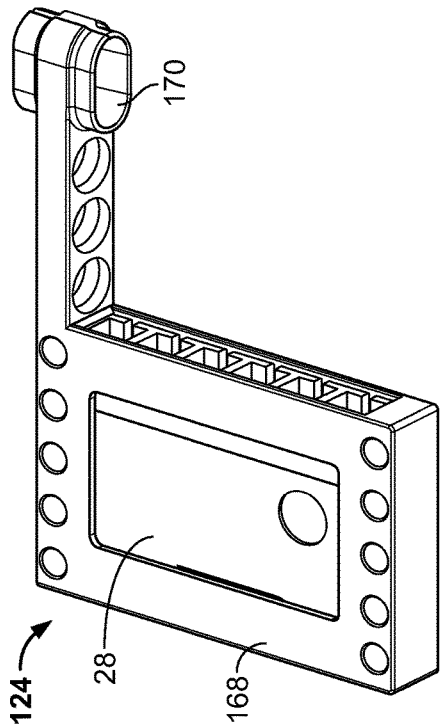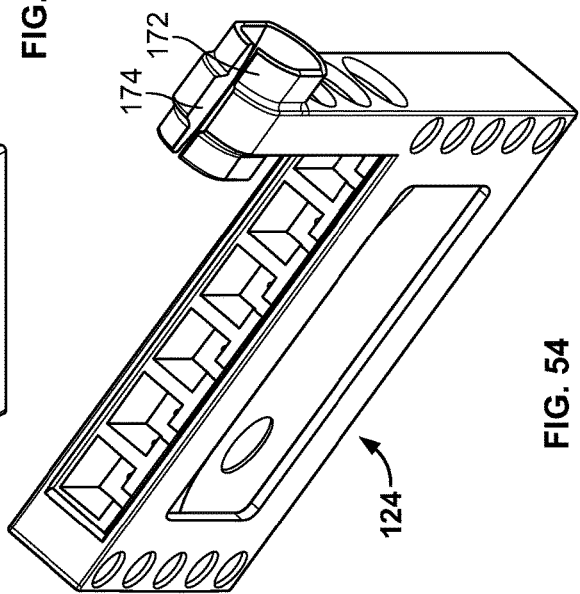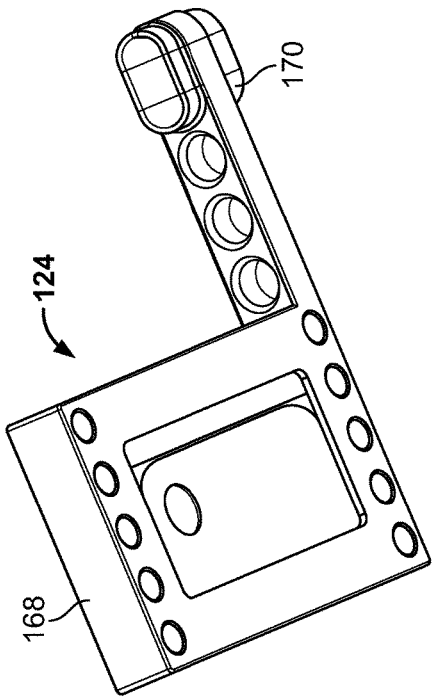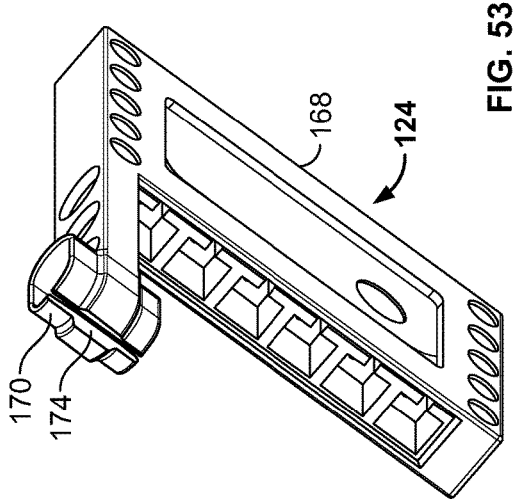

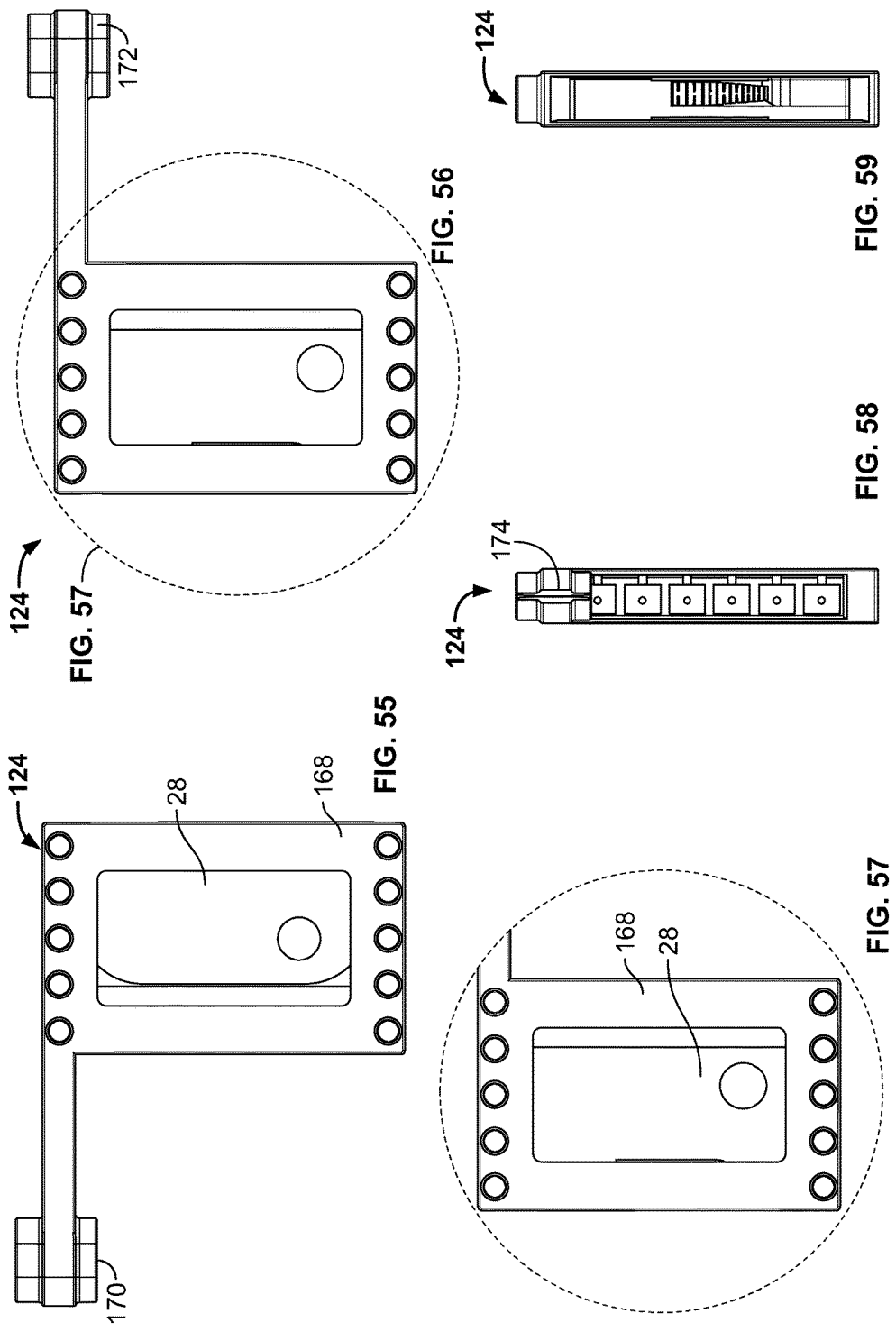

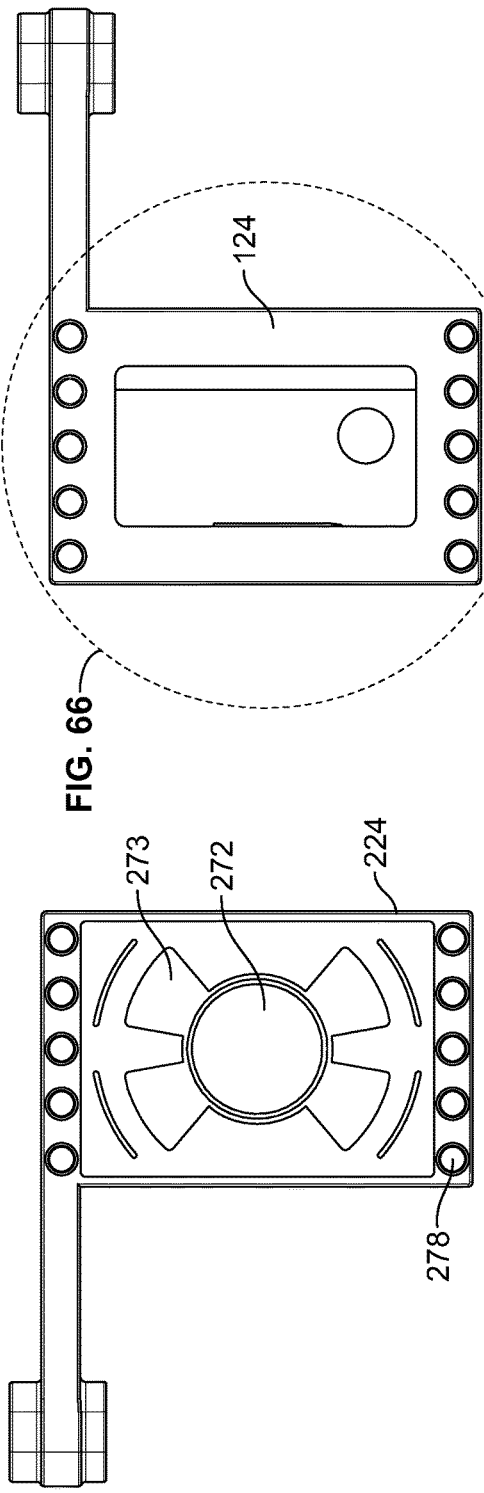
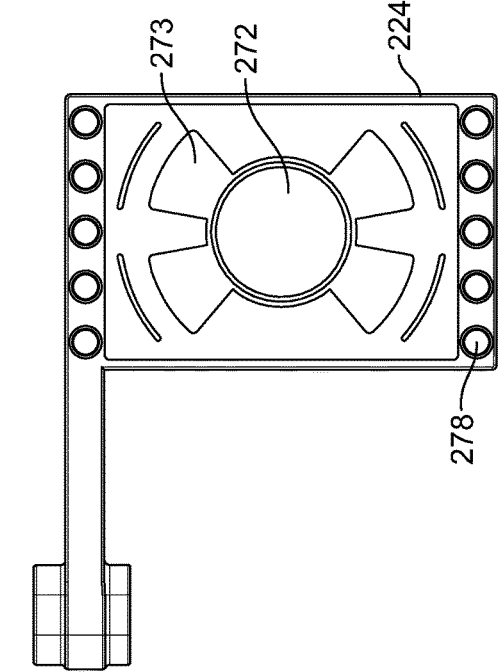
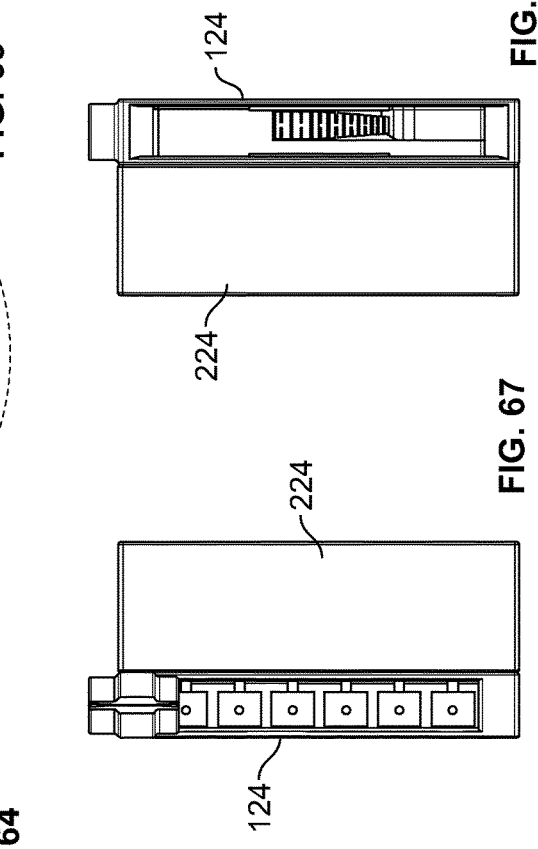
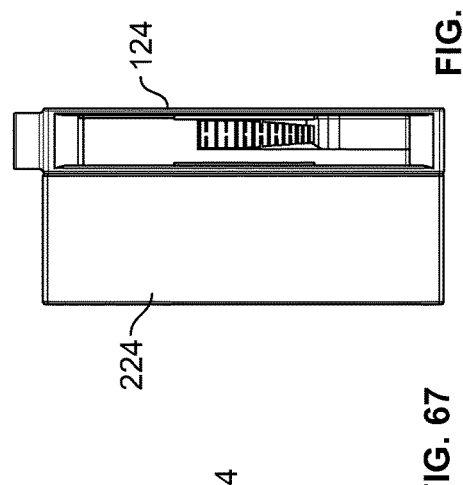

MODULAR HIGH DENSITY TELECOMMUNICATIONS FRAME AND CHASSIS SYSTEM

CROSS-REFERENCE TO RELATED APPLICATIONS

The present application is a continuation of U.S. patent application Ser. No. 15/256,167, filed Sep. 2, 2016, now U.S. Pat. No. 9,952,398; which is a continuation of U.S. patent application Ser. No. 14/213,077, filed Mar. 14, 2014, now U.S. Pat. No. 9,435,975; which claims the benefit of U.S. Provisional Patent Application Ser. No. 61/790,127, filed Mar. 15, 2013, which applications are hereby incorporated by reference in their entireties.

TECHNICAL FIELD

The present disclosure relates generally to fiber optic telecommunications equipment. More specifically, the present disclosure relates to a modular fiber optic frame and chassis system designed for high density applications.

BACKGROUND

In telecommunications industry, the demand for added capacity is growing rapidly. This demand is being met in part by the increasing use and density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

An example of this type of equipment is found in U.S. Pat. No. 6,591,051 (the '051 patent) assigned to ADC Telecommunications, Inc. This patent concerns a high-density fiber distribution frame and high-density fiber termination blocks (FTBs) which are mounted to the frame. Because of the large number of optical fibers passing into and out of the FTBs, the frame and blocks have a variety of structures to organize and manage the fibers. Some structures are used to aid the fibers entering the back of the frame and FTBs. Other structures are provided for managing the cables leaving the FTBs on the front. The FTBs also include structures for facilitating access to the densely packed terminations. One such structure is a slidable adapter module that is incorporated into the FTBs to allow selective access to the densely packed terminations inside the FTBs.

Further development in such fiber termination systems is desired.

SUMMARY

The present disclosure relates to fiber optic telecommunications devices. The telecommunications devices include a modular frame and chassis system for housing a high density of fiber optic connection locations.

According to one example aspect, the disclosure relates to a fiber optic telecommunications device that includes a frame defining a right vertical support and a left vertical support. A chassis is mounted to the right and left vertical supports, wherein the chassis is configured to pivot about a pivot axis that is defined by one of the right and left vertical supports. A plurality of modules are mounted on the chassis, each of the modules slidable on the chassis along a direction extending between the right and left vertical supports, wherein the chassis is configured to pivot about a plane parallel to the sliding direction of the modules, each module defining fiber optic connection locations.

According to another example aspect, the disclosure relates to a fiber optic chassis comprising a right rack mount portion and a left rack mount portion and at least one slide extending between the right and left rack mount portions. One of the right rack mount portion and the left rack mount portion defines at least a part of a hinge structure for pivotally mounting the fiber optic chassis to a telecommunications fixture. A plurality of modules is mounted on the chassis along a horizontal stack extending between the right and left rack mount portions. Each of the modules is slidable on the slide along a direction extending between the right and left rack mount portions, each module configured to receive fiber optic equipment defining fiber optic connection locations.

According to another aspect, the disclosure relates to a fiber optic chassis comprising a right rack mount portion and a left rack mount portion and at least one slide extending between the right and left rack mount portions. A plurality of modules are mounted on the chassis in a stacked configuration extending between the right and left rack mount portions, each module configured to receive fiber optic equipment defining connection ports that face out along a front to back direction. Each of the modules is slidable on the slide along a direction extending between the right and left rack mount portions that is perpendicular to the front to back direction.

According to another example aspect, the disclosure relates to a telecommunications module for slidable mounting to a telecommunications chassis. The module includes a housing portion configured to removably receive fiber optic equipment defining fiber optic connection locations, the housing portion defining a right side, a left side, a front side, and a rear side, wherein the housing portion is configured such that the fiber optic connection locations are accessible from at least one of the front side and the rear side. A plurality of holes extend from the right side to the left side of the housing portion for receiving slides for slidably coupling the module to the telecommunications chassis. The module further includes a cable management structure in the form of a split-ring for receiving cables extending to and from the fiber optic connection locations.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 1 is a front perspective view of a telecommunications chassis having features that are examples of inventive aspects in accordance with the principles of the present disclosure, the chassis shown in isolation, not mounted to a telecommunications rack;

FIG. 2 is a top perspective view of the chassis of FIG. 1;

FIG. 3 is a bottom perspective view of the chassis of FIG. 1;

FIG. 4 is a right side perspective view of the chassis of FIG. 1;

FIG. 5 illustrates a front perspective view of the chassis of FIG. 1, wherein the chassis is shown in an empty configuration without fiber optic cassettes of the chassis mounted within slidable carrier modules of the chassis;

FIG. 6 is a top perspective view of the empty chassis of FIG. 5;

FIG. 13 illustrates a standard telecommunications rack with eleven of the chassis of FIG. 1 mounted in a vertically stacked arrangement on the rack;

FIG. 14 illustrates a standard telecommunications rack with fourteen of the chassis of FIG. 1 mounted in a vertically stacked arrangement on the rack;

FIG. 26 is a left side, top perspective view of one of the carrier modules that is configured for slidable mounting on the telecommunications chassis of FIG. 1;

FIG. 27 is a right side, top perspective view of the slidable carrier module of FIG. 26;

FIG. 28 is a left side, bottom perspective view of the slidable carrier module of FIG. 26;

FIG. 29 is another bottom, left side perspective view of the slidable carrier module of FIG. 26;

FIG. 47 is a left side view of the fiber optic cassette of FIG. 43;

FIG. 48 is a right side view of the fiber optic cassette of FIG. 43;

FIG. 49 is a close-up view of a portion of the fiber optic cassette of FIG. 48;

FIG. 50 is a front view of the fiber optic cassette of FIG. 43;

FIG. 51 is a left side, top perspective view of another embodiment of a carrier module that is configured for slidable mounting on the telecommunications chassis of FIG. 1;

FIG. 52 is a right side, top perspective view of the slidable carrier module of FIG. 51;

FIG. 53 is a left side, bottom perspective view of the slidable carrier module of FIG. 51;

FIG. 54 is another bottom, left side perspective view of the slidable carrier module of FIG. 51;

FIG. 55 is a left side view of the slidable carrier module of FIG. 51;

FIG. 56 is a right side view of the slidable carrier module of FIG. 51;

FIG. 57 is a close-up view of a portion of the slidable carrier module of FIG. 56;

FIG. 58 is a front view of the slidable carrier module of FIG. 51;

FIG. 59 is a rear view of the slidable carrier module of FIG. 51;

FIG. 64 is a left side view of the slidable carrier module and the coupled cable storage module of FIG. 60;

FIG. 65 is a right side view of the slidable carrier module and the coupled cable storage module of FIG. 60;

FIG. 66 is a close-up view of a portion of the slidable carrier module and the coupled cable storage module of FIG. 65;

FIG. 67 is a front view of the slidable carrier module and the coupled cable storage module of FIG. 60; and FIG. 68 is a rear view of the slidable carrier module and the coupled cable storage module of FIG. 60.

DETAILED DESCRIPTION

Figure 7:
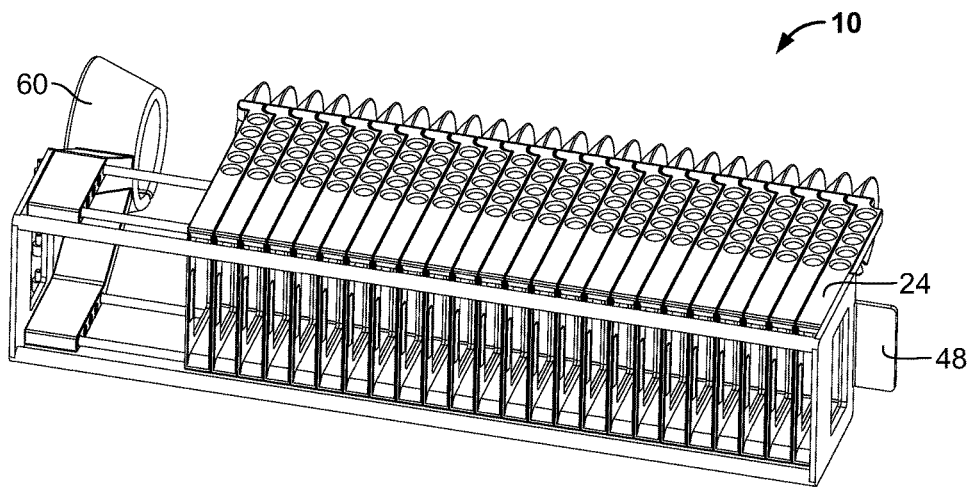
FIG. 7 is a bottom perspective view of the empty chassis of FIG. 5.
Figure 8:
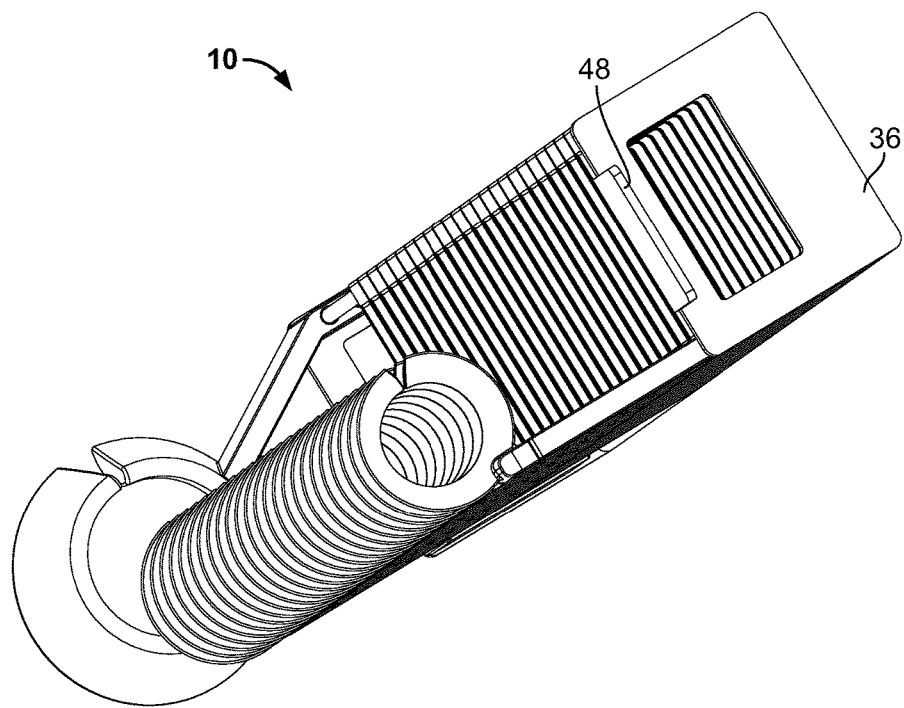
FIG. 8 is a right side perspective view of the empty chassis of FIG. 5.
Figure 9:
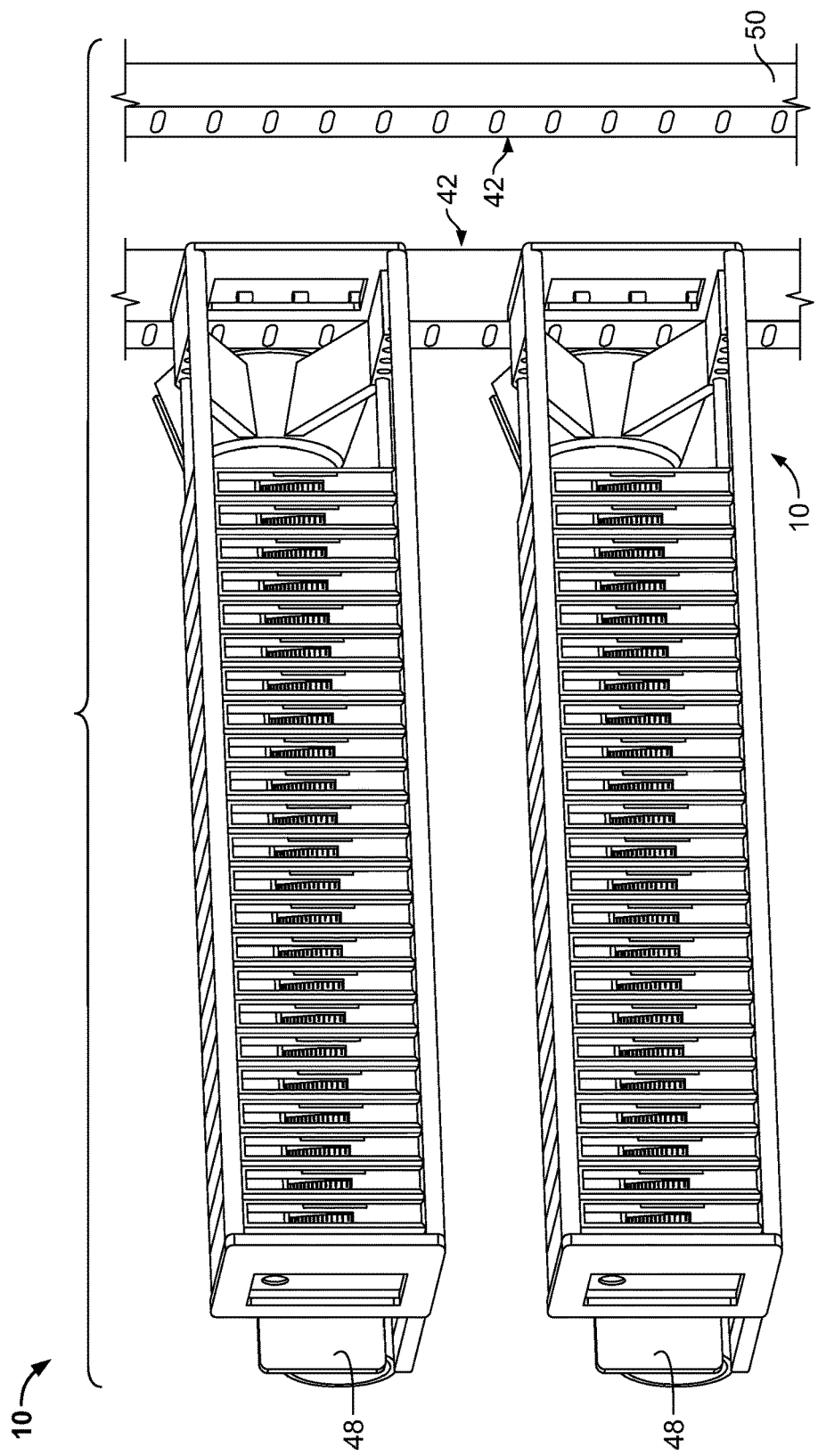
FIG. 9 illustrates a portion of a telecommunications rack showing two of the chassis of FIG. 1 pivotally mounted on the rack.

Reference will now be made in detail to examples of inventive aspects of the present disclosure which are illustrated in the accompanying drawings. Wherever possible, the same reference numbers will be used throughout the drawings to refer to the same or like parts.

Referring now to FIGS. 1-8, a modular, high density telecommunications chassis 10 having features that are examples of inventive aspects in accordance with the principles of the present disclosure is disclosed. In FIGS. 1-8, the chassis 10 is shown in isolation, removed from a telecommunications rack or frame. In FIGS. 9-25, the chassis 10 is shown mounted on telecommunications fixtures such as telecommunications racks or frames, which will be described in further detail below. It should be noted that in the present disclosure, the terms "rack" and "frame" will be used interchangeably.

Referring back to FIGS. 1-8, the chassis 10 defines a right side 12, a left side 14, a front side 16, a rear side 18, a top side 20, and a bottom side 22. The chassis 10 is configured to house a plurality of slidable carrier modules 24. As will be discussed in further detail below, the carrier modules 24 are configured to house equipment defining fiber optic connection or termination locations or terminals 26. According to one example embodiment, the fiber optic connection locations 26 may be defined by equipment such as fiber optic cassettes 28. An example of a fiber optic cassette 28 which may be used with the chassis 10 shown in FIGS. 1-8 is illustrated in isolation in FIGS. 43-50. Such fiber optic cassettes 28 may be removable devices and may be loaded to the carrier modules 24 as desired. In the depicted example, the chassis 10 is shown populated with the fiber optic cassettes 28 in FIGS. 1-4. In FIGS. 5-8, the chassis 10 is shown in an empty configuration without the fiber optic cassettes 28 mounted to the carrier modules 24 of the chassis. As will be explained in further detail below, the cassettes 28 may provide terminals 26 in the form of fiber optic adapters 30 accessible from the front ends 32 of the cassettes 28. The fiber optic adapters 30 may be LC-type, SC-type, or other formats of adapters 30.

The chassis 10 defines a pair of chassis supports 34 at the rear side 18 that extend between a right end cap 36 and a left end cap 38, the chassis supports 34 configured to provide reinforcement to the modular chassis 10. The chassis 10 also includes a plurality of slide structures 40 that extend between the right and left end caps 36, 38. The slide structures 40 are configured to slidably receive the carrier modules 24 and allow the carrier modules 24 to slide along a right to left direction within the chassis 10. The slidability of the carrier modules 24 allows technicians to isolate specific carrier modules 24 for connectivity work on those modules 24. The slidability also allows technicians to access rear connection locations 26 on the fiber optic cassettes 28 mounted on the carrier modules 24.

Referring back to FIGS. 1-8, the chassis 10 may be configured such that the right and left end caps 36, 38 are removable structures. The chassis supports 34 and the slides 40 may define pin-like structures that are received by the end caps 36, 38 for the removable mounting of the end caps 36, 38.

According to an example embodiment of the disclosure, the chassis 10 is configured to be pivotally mounted to a fixture such as a standard telecommunications rack 42. The rear side 18 of the chassis 10 (and fiber optic connection locations 26 at the rear 44 of the carrier modules 24) can be accessed by pivoting the chassis 10. In the depicted embodiment, the left end cap 38 defines hinge pins 46. The hinge pins 46 may be inserted into hinge receptacles provided on one of the vertical rack supports that define the rack 42. Along with the hinge receptacles, the hinge pins 46 form a hinge structure for providing pivotability to the chassis 10.

Figure 10:
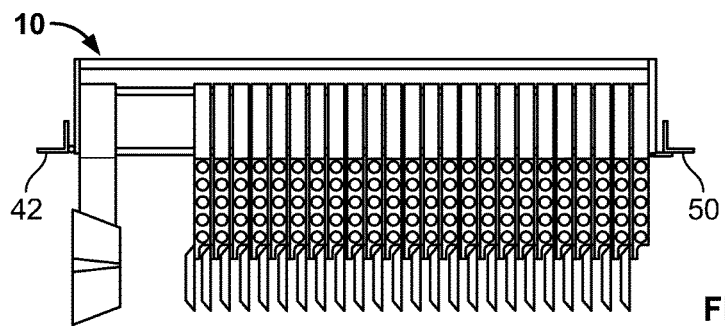
FIG. 10 is a top view of the chassis of FIG. 1 mounted on a telecommunications rack, wherein the chassis is shown in a non-pivoted, fully closed position.
Figure 11:
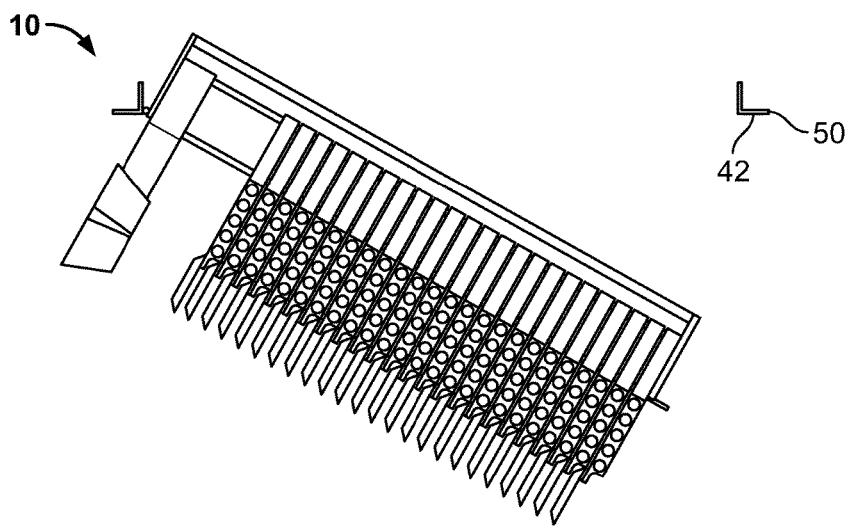
FIG. 11 illustrates the chassis of FIG. 10 in a partially pivoted position with respect to the rack.
Figure 12:
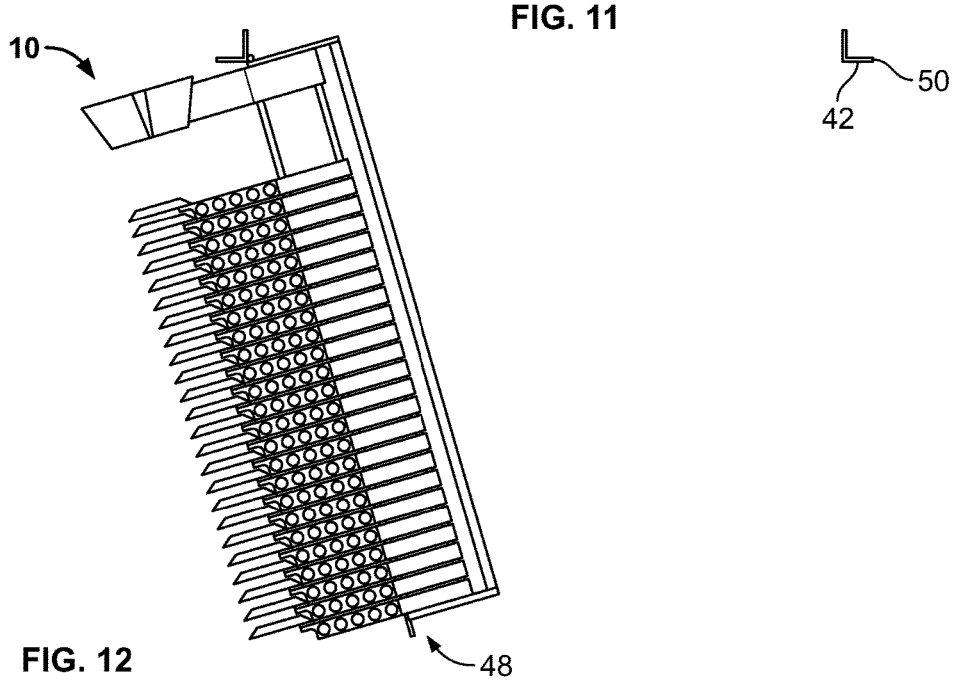
FIG. 12 illustrates the chassis of FIG. 10 in a fully pivoted, open position with respect to the rack.

As noted above, the modular chassis 10 may be mounted on a variety of different telecommunications fixtures. As an example, in FIGS. 9-12, a portion of a telecommunications rack 42 is shown, wherein two of the chassis 10 are pivotally mounted thereon. The pivotal action of the chassis 10 when mounted to such a rack 42 is shown in FIGS. 10-12. FIG. 10 illustrates the chassis 10 mounted on the telecommunications rack 42 from the top view, wherein the chassis 10 is shown in a non-pivoted, fully closed position. FIG. 11 illustrates the chassis 10 of FIG. 10 in a partially pivoted position with respect to the rack 42. And, FIG. 12 illustrates the chassis 10 of FIG. 10 in a fully pivoted, open position with respect to the rack 42.

When the chassis 10 is mounted on a standard telecommunications rack such as the rack 42 shown in FIGS. 9-12, the chassis 10 takes up two standard rack spaces and may be classified as a 2RU (2 standard rack unit) chassis. The width of the chassis may be sized according to the width of the rack used (e.g., 19 inches for a 19-inch telecommunications rack). As shown in FIGS. 1-8, a standard 19-inch chassis 10 may house up to twenty-four slidable carrier modules 24, with enough spacing S provided to accommodate the slidable movement of the modules 24 for access.

Figure 15:
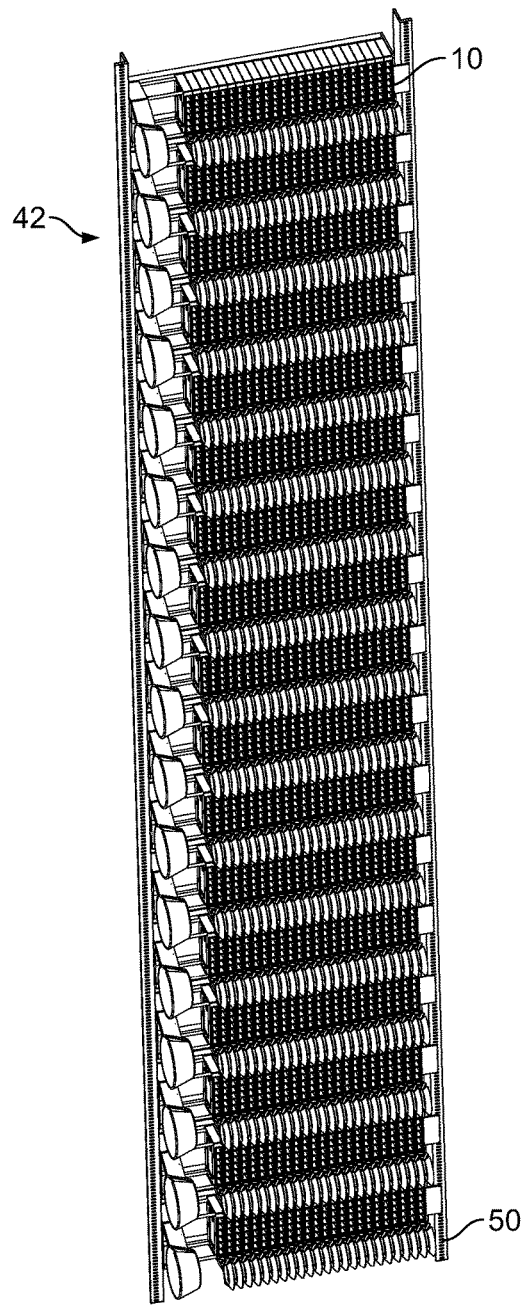
FIG. 15 illustrates a standard telecommunications rack with seventeen of the chassis of FIG. 1 mounted in a vertically stacked arrangement on the rack.
Figure 16:
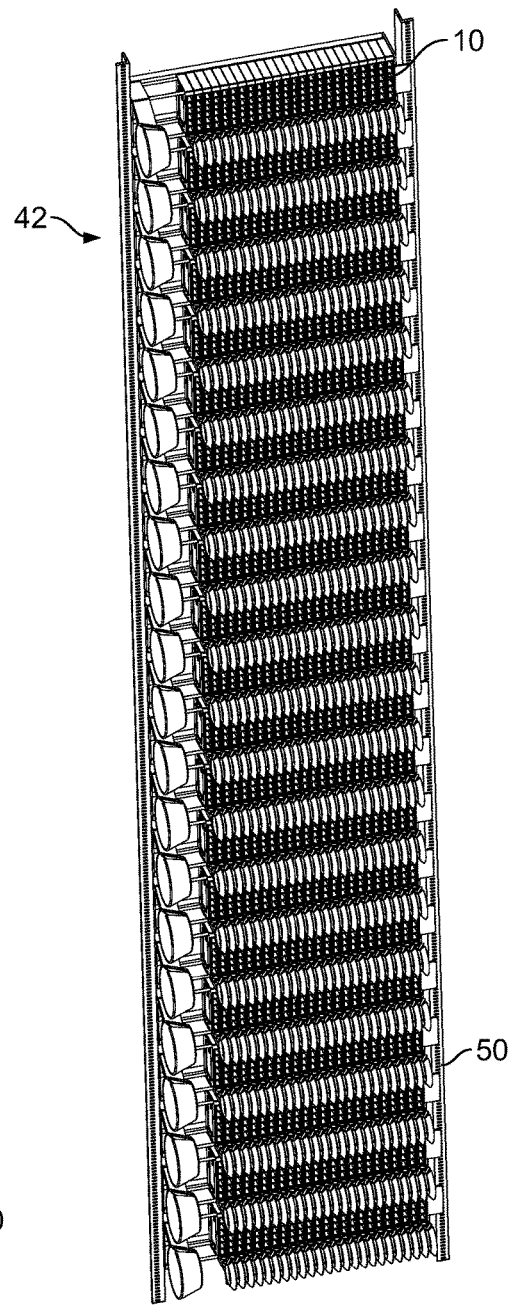
FIG. 16 illustrates a standard telecommunications rack with twenty-one of the chassis of FIG. 1 mounted in a vertically stacked arrangement on the rack.
Figure 17:
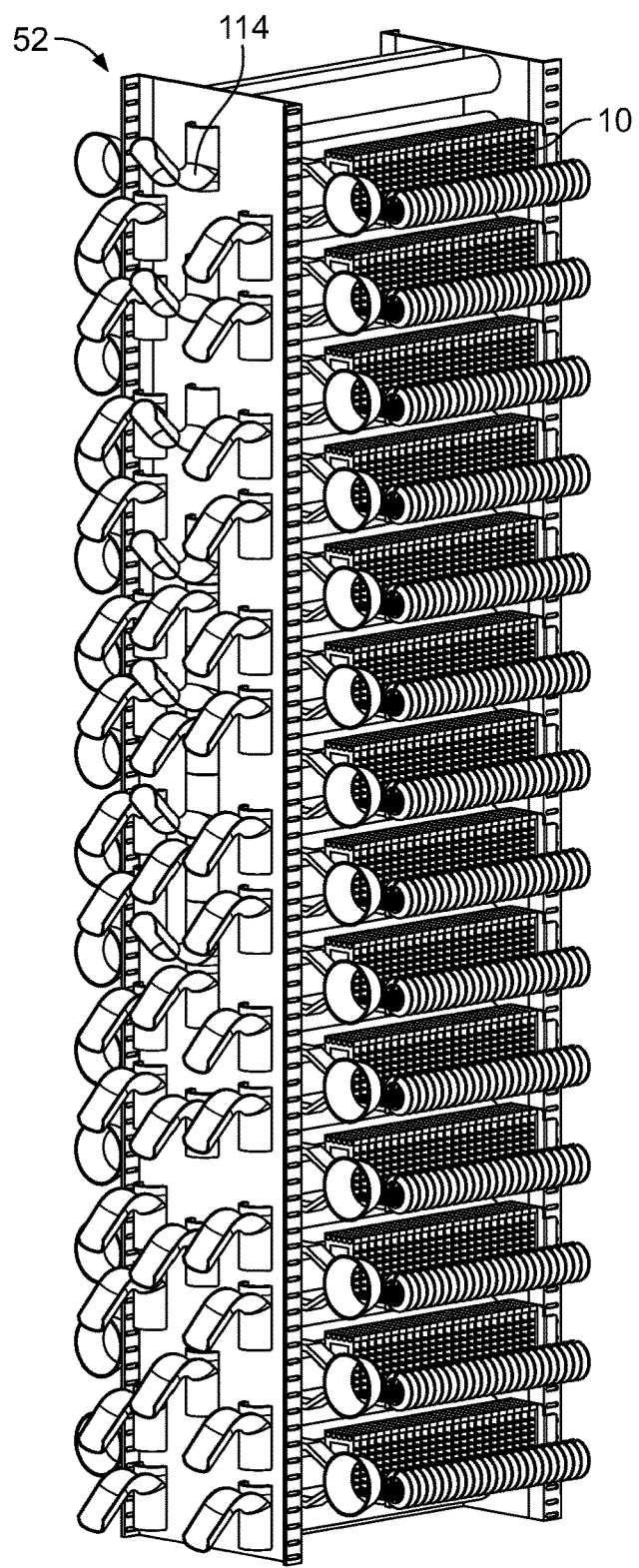
FIG. 17 is a front, left side perspective view of a telecommunications frame including two sets of the telecommunications chassis of FIG. 1 mounted in a back-to-back configuration with a cable storage panel located therebetween.
Figure 18:
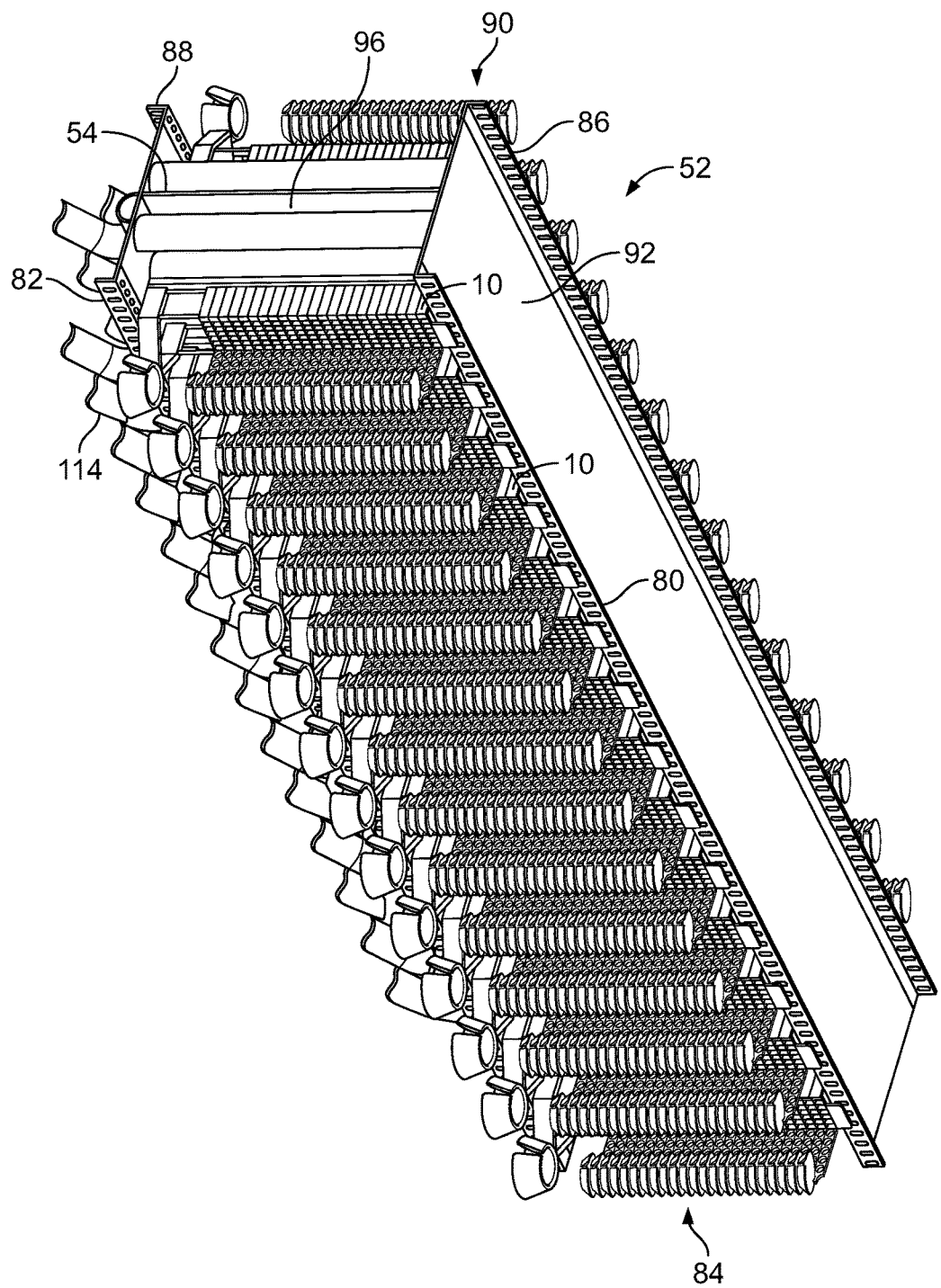
FIG. 18 is a top, right side perspective view of the telecommunications frame of FIG. 17.
Figure 19:
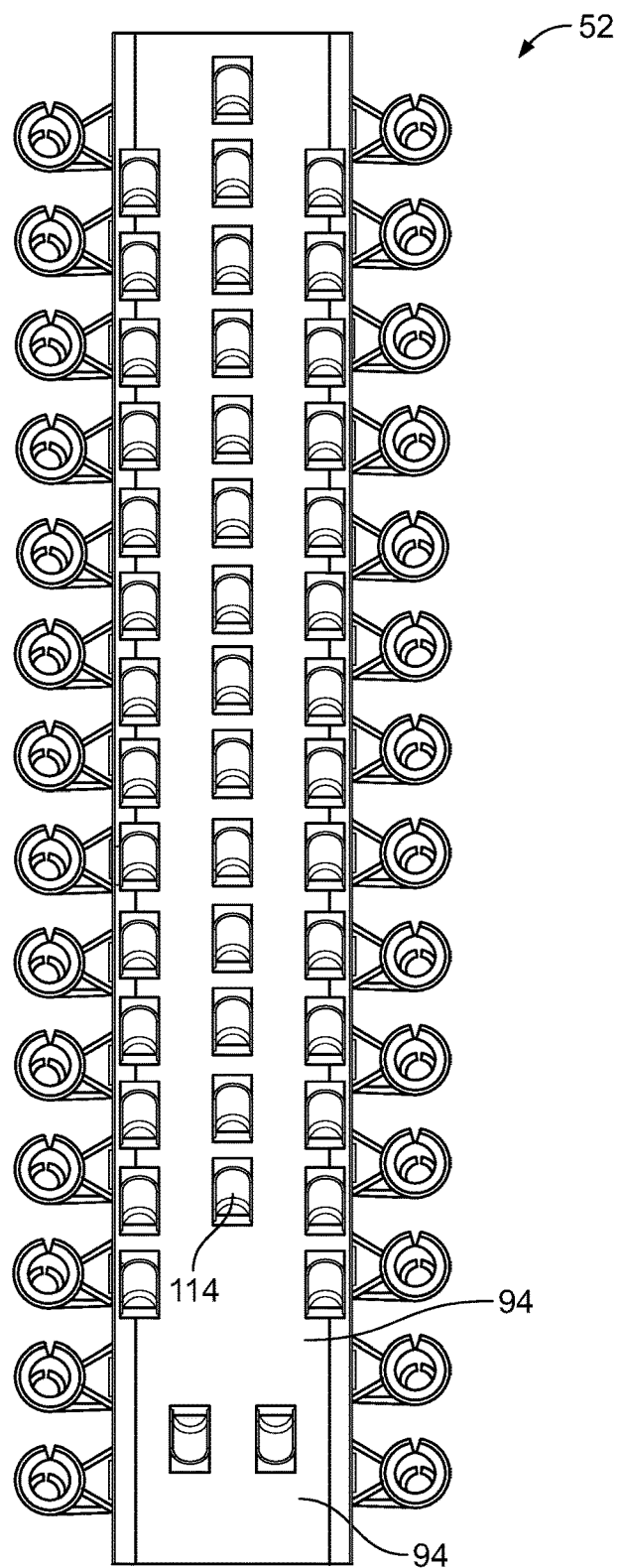
FIG. 19 is a left side view of the telecommunications frame of FIG. 17.
Figure 20:
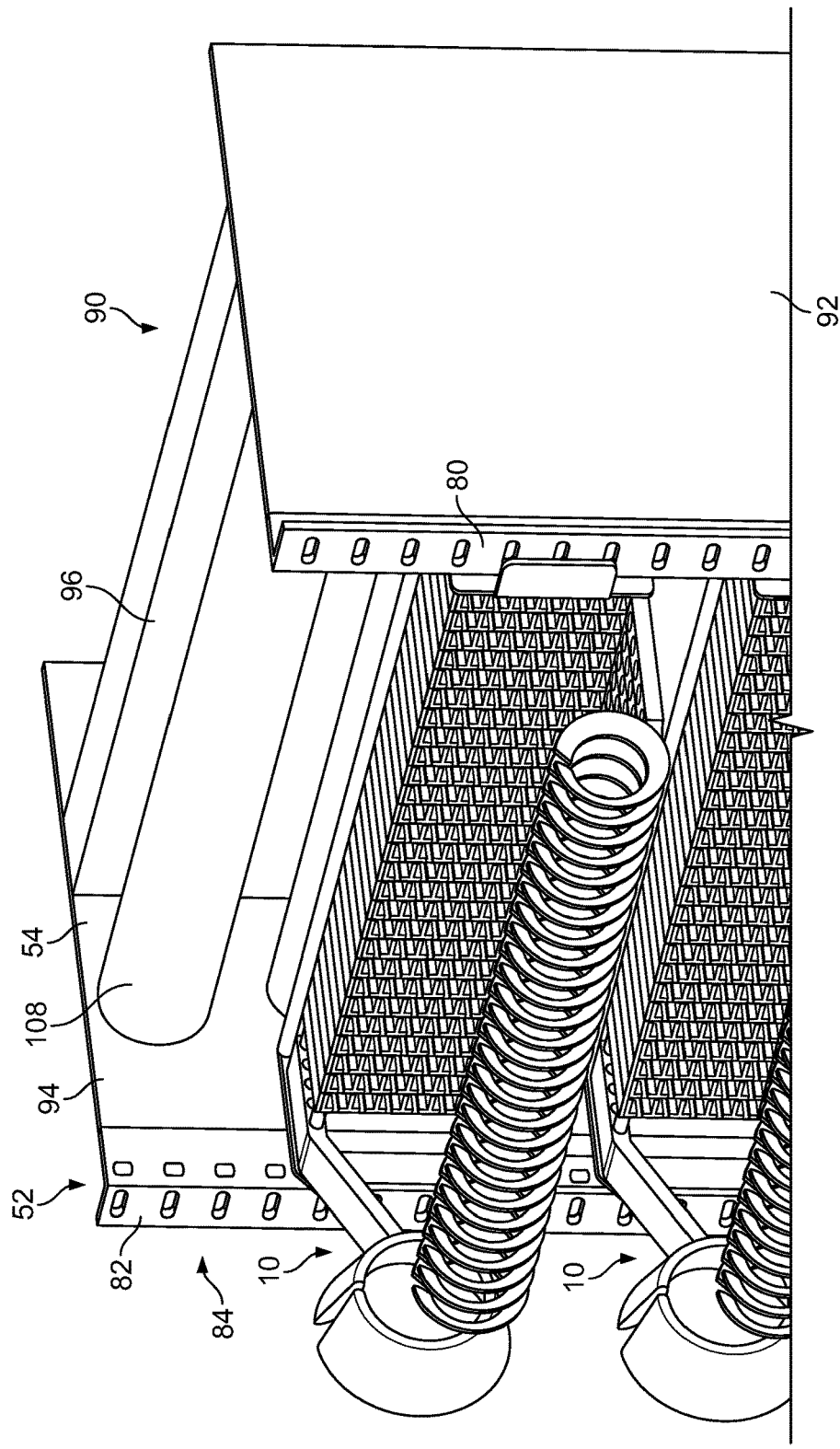
FIG. 20 is a right side perspective view showing a portion of the frame of FIG. 17.

The density of the fiber optic connections 26 that may be provided by the chassis 10 of the present disclosure, when being mounted on a standard telecommunications rack 42, is illustrated by FIGS. 13-16. FIG. 13 illustrates a standard telecommunications rack 42 with eleven of the chassis 10 of FIGS. 1-8 mounted in a vertically stacked arrangement on the rack 42. FIG. 14 illustrates a standard telecommunications rack 42 with fourteen of the chassis 10 of FIGS. 1-8 mounted in a vertically stacked arrangement on the rack 42. FIG. 15 illustrates a standard telecommunications rack 42 with seventeen of the chassis 10 of FIGS. 1-8 mounted in a vertically stacked arrangement on the rack 42. FIG. 16 illustrates a standard telecommunications rack 42 with twenty-one of the chassis 10 of FIGS. 1-8 mounted in a vertically stacked arrangement on the rack 42.

As depicted, the right end cap 36 of the chassis 10 may include a mounting flange 48. The mounting flange 48 can include a variety of structures for locking and unlocking the chassis 10 with respect to a right vertical rack support 50 of the rack 42. For example, according to one example, the mounting flange 48 and the right vertical rack support 50 can define a swell-latch type locking arrangement. For the purposes of pivotability, the configurations of the right and left sides of the chassis 10 can be reversed.

Other types of telecommunications fixtures to which the chassis 10 of the present disclosure may be mounted include other types of racks or frames. For example, FIGS. 17-25 illustrate a telecommunications frame 52 wherein two sets of the telecommunications chassis 10 may be mounted in a back-to-back configuration. A cable storage panel 54, further details of which will be described below, may be provided between the two sets of chassis 10 for storage of cabling that extend from the rear connection locations 26 of the carrier modules 24.

As noted above, the chassis 10 of the present disclosure is configured to be a completely modular structure that can be formed from removable structures and can be populated with the desired number of slidable carrier modules 24. As shown in FIGS. 1-4, when the chassis 10 is populated with the carrier modules 24, there is a predetermined amount of spacing S provided to allow slidability of the modules 24 along a right to left direction to access the rear side 44 of the carrier modules 24.

In addition to the slidable carrier modules 24, each chassis 10 may also include a slidable cable management module 56. The cable management module 56 may define a chassis cable management structure 58 in the form of a ring 60 for managing all of the cables 62 that are extending to or from the individual carrier modules 24. In the depicted embodiment, the cable management ring 60 may define a split-ring configuration with a notch 64 for receiving cables 62 into the rings 60 for management. The cable management module 56 defines slide holes 66 that receive the slide structures 40 of the chassis 10 to allow right to left travel of the cable management module 56.

Regarding each of the slidable carrier modules 24, one of the slidable carrier modules 24 is shown in isolation in FIGS. 26-34 with a fiber optic cassette 28 loaded therein. The slidable carrier module 24 is shown without a fiber optic cassette 28 in FIGS. 35-42.

Now referring to FIGS. 26-42, each slidable carrier module 24 defines a housing portion 68 for receiving equipment such as a fiber optic cassette 28 and a cable management portion 70. According to the depicted embodiment, the cable management portion 70 is defined by a cable management ring 72 similar to that of the cable management module 56. The cable management ring 72 may define a split-ring configuration with a notch 74 for receiving cables 62 into the ring 72 for management. The cable management ring 72 defines a slightly cone-shaped configuration. Each carrier module 24 also defines a recess 76 for accommodating a portion of the cable management ring 72 from an adjacent carrier module 24 when the carrier modules 24 are in a stacked configuration from left to right.

The carrier module 24 defines slide holes 78 for receiving the slide structures 40 of the chassis 10 to allow slidable travel of the carrier modules 24.

Now referring back to FIGS. 17-25, as noted above, the pivotable aspect of the chassis 10 of FIGS. 1-4 allows the chassis 10 to be mounted on a telecommunications frame 52 in a back-to-back configuration. In such a configuration, the frame 52 may define right and left vertical rack supports 80, 82 at a front side 84 of the frame 52 for mounting a first set of chassis 10 and right and left vertical rack supports 86, 88 at a rear side 90 of the frame 52 for mounting second set of chassis 10.

The telecommunications frame 52 depicted in FIGS. 17-25 includes a cable management panel 54 positioned between the two sets of chassis 10. Positioned as such, the cable management panel 54 can manage cabling 62 extending from the rear sides 33 of the cassettes 28 mounted within the carrier modules 24 of the chassis 10 and can be accessed due to the pivotability of the chassis 10.

The cable management panel 54 is mounted to the right and left vertical rack supports 80, 82 at the front side 84 of the frame 52 and also the right and left vertical rack supports 86, 88 at the rear side 90 of the frame 52. The cable management panel 54 defines a right vertical support 92, a left vertical support 94, and a center divider 96 that divides the cable management panel 54 into a front cable management/storage area 98 (for managing cables 62 from the chassis 10 at the front side 84 of the frame 52) and a rear cable management/storage area 100 (for managing cables 62 from the chassis 10 at the rear side 90 of the frame 52).

The front and rear cable management areas 98, 100 may be similarly configured. Each of the front and rear cable management areas 98, 100 defines a number of cable management structures 102 provided along a column extending from a top 104 of the panel 54 to the bottom 106 of the panel 54.

Figure 24:
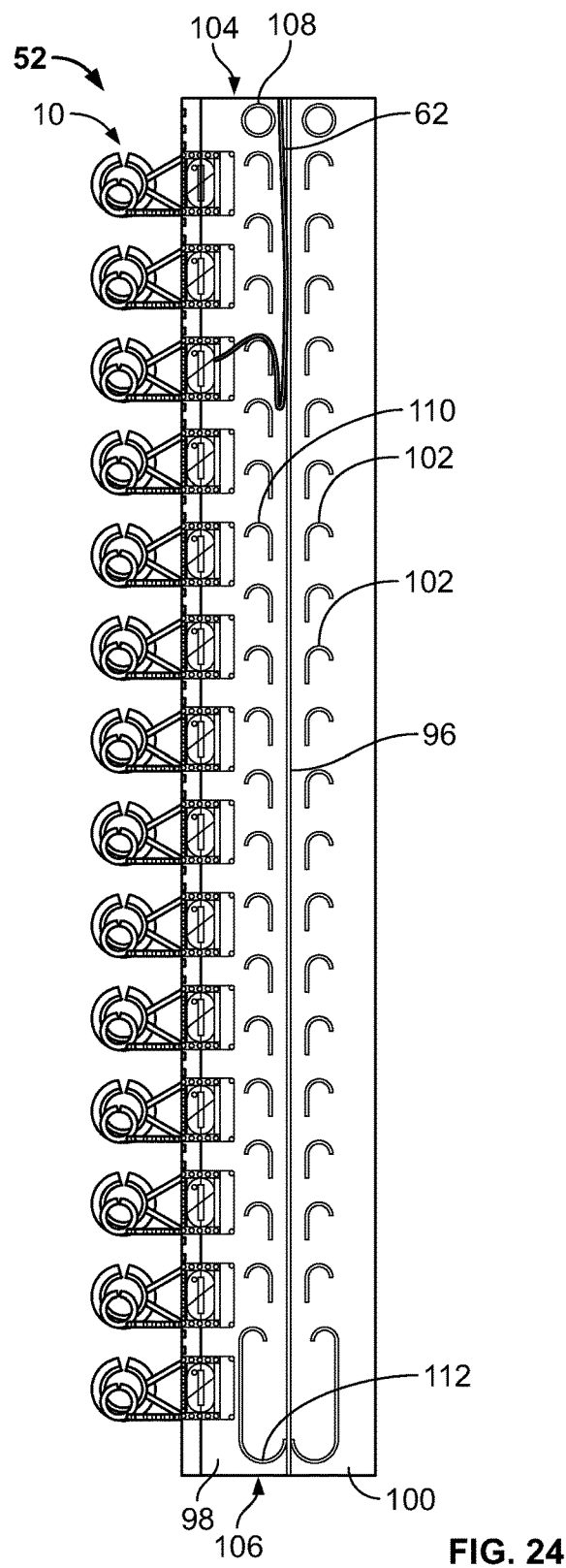
FIG. 24 illustrates a side view of the telecommunications frame of FIG. 17 with only one set of the telecommunications chassis of FIG. 1 mounted to one side (e.g., the front side) of the frame and with a right vertical support of the cable storage panel removed to illustrate the internal cable management structures of the cable storage panel from the side view.
Figure 25:
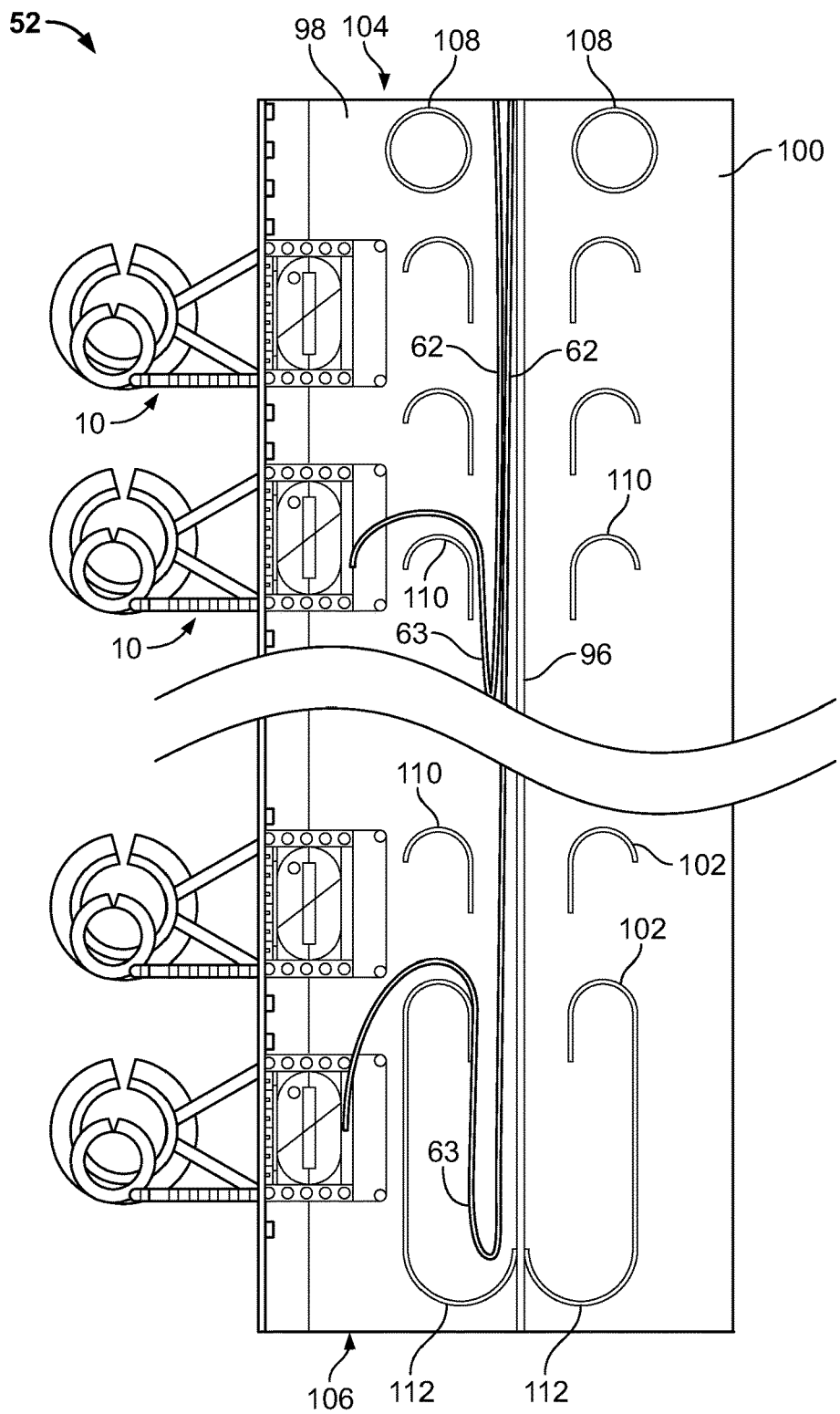
FIG. 25 illustrates close-up views of the top portion and the bottom portion of the telecommunications frame of FIG. 24.
Figure 30:
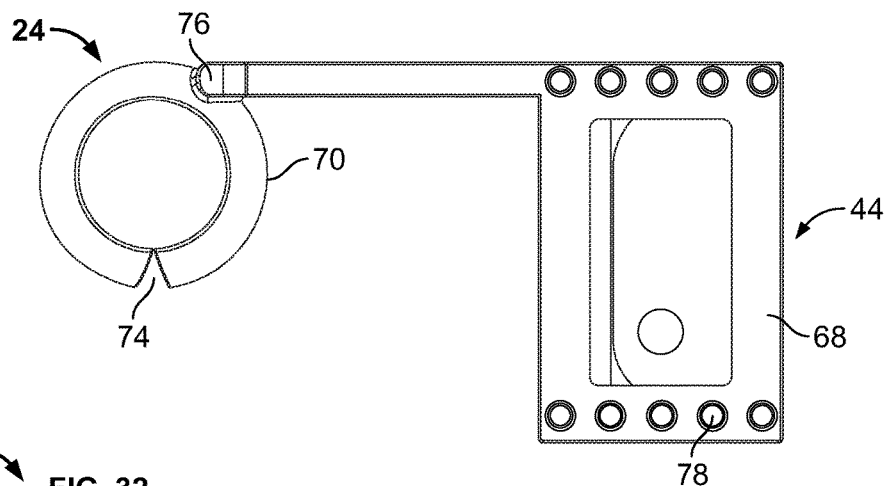
FIG. 30 is a left side view of the slidable carrier module of FIG. 26.
Figure 31:
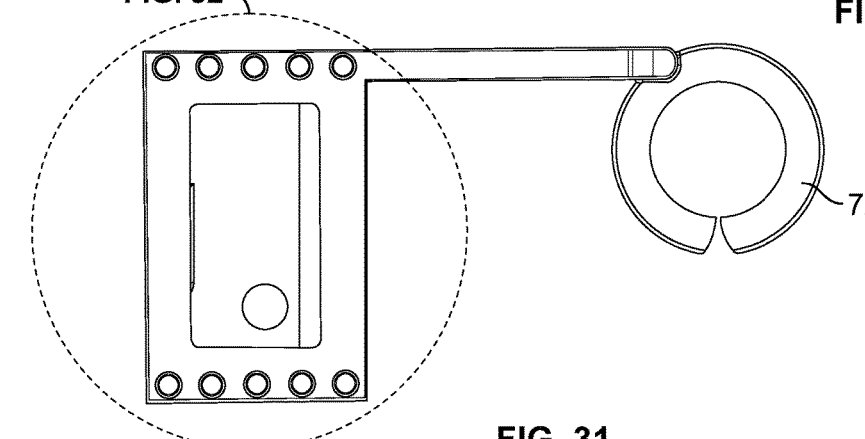
FIG. 31 is a right side view of the slidable carrier module of FIG. 26.
Figures 32, 33, 34:
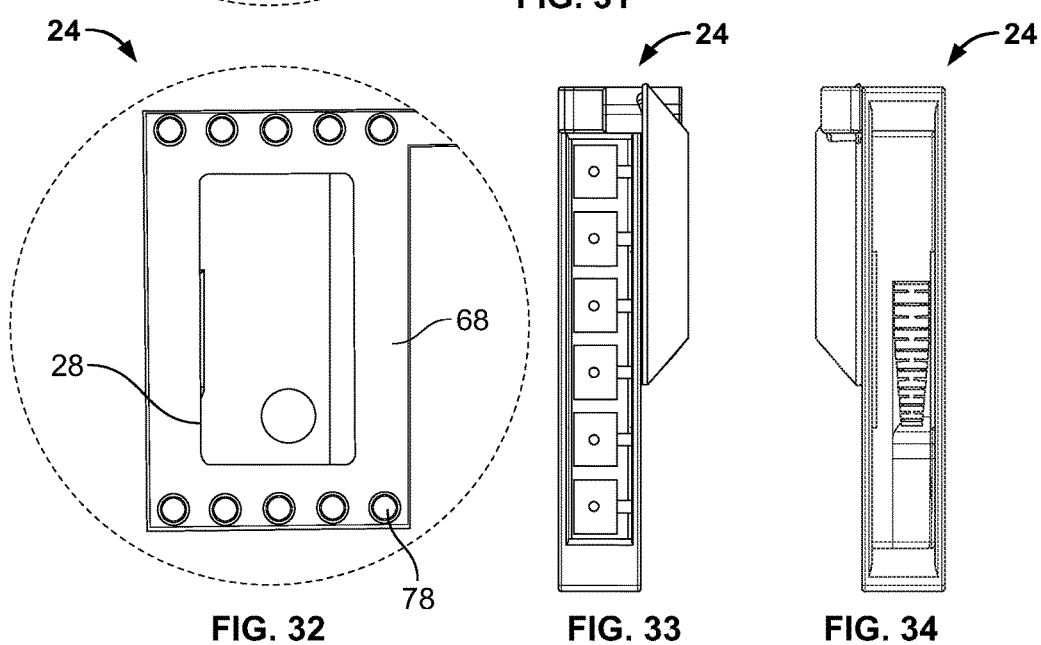
FIG. 32 is a close-up view of a portion of the slidable carrier module of FIG. 31.
FIG. 33 is a front view of the slidable carrier module of FIG. 26.
FIG. 34 is a rear view of the slidable carrier module of FIG. 26.
Figure 37:
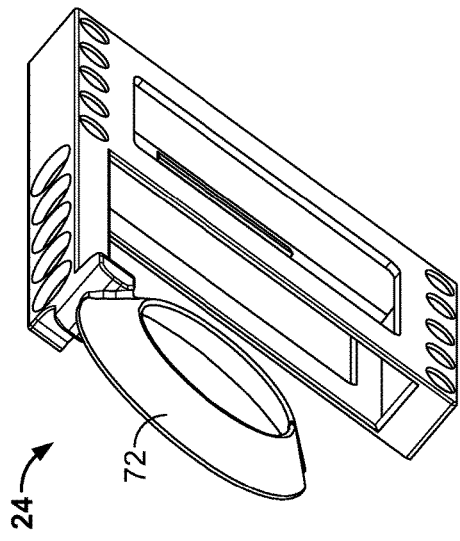
FIG. 37 is a left side, bottom perspective view of the slidable carrier module of FIG. 35.
Figure 38:
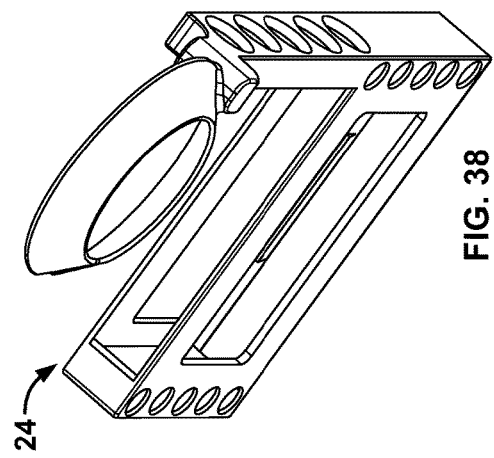
FIG. 38 is another bottom, left side perspective view of the slidable carrier module of FIG. 35.
Figure 35:
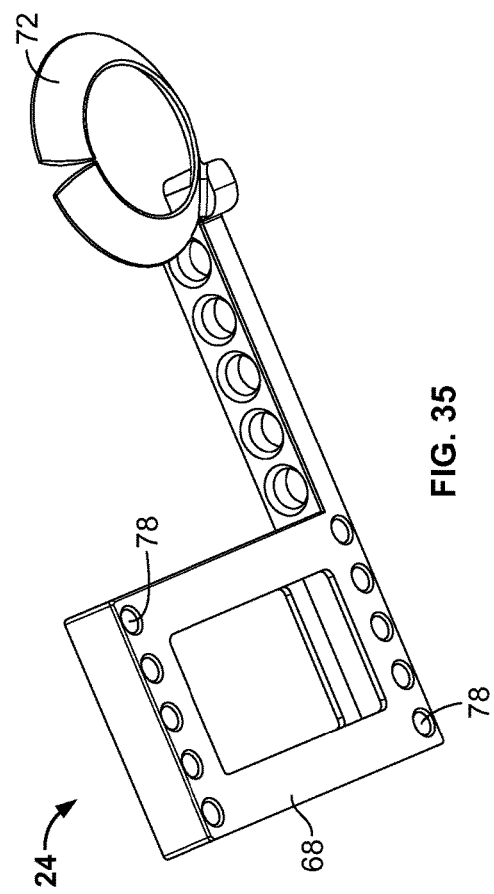
FIG. 35 is a left side, top perspective view of the carrier module of FIG. 26 shown without a fiber optic cassette mounted therein.
Figure 36:
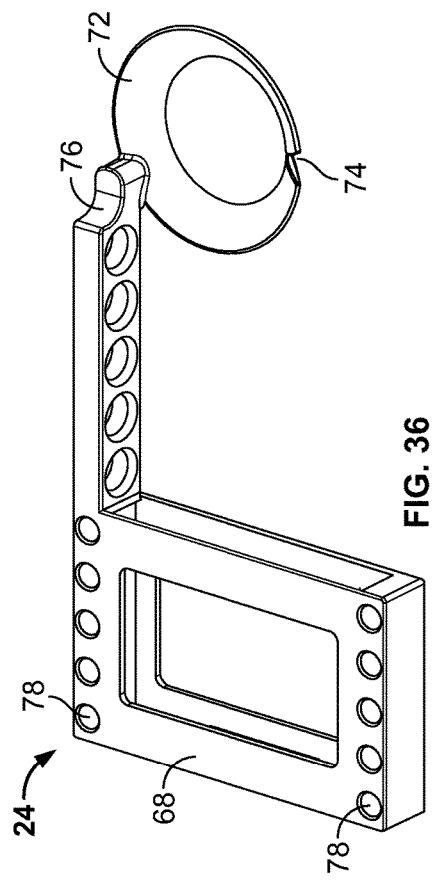
FIG. 36 is a right side, top perspective view of the slidable carrier module of FIG. 35.
Figure 39:
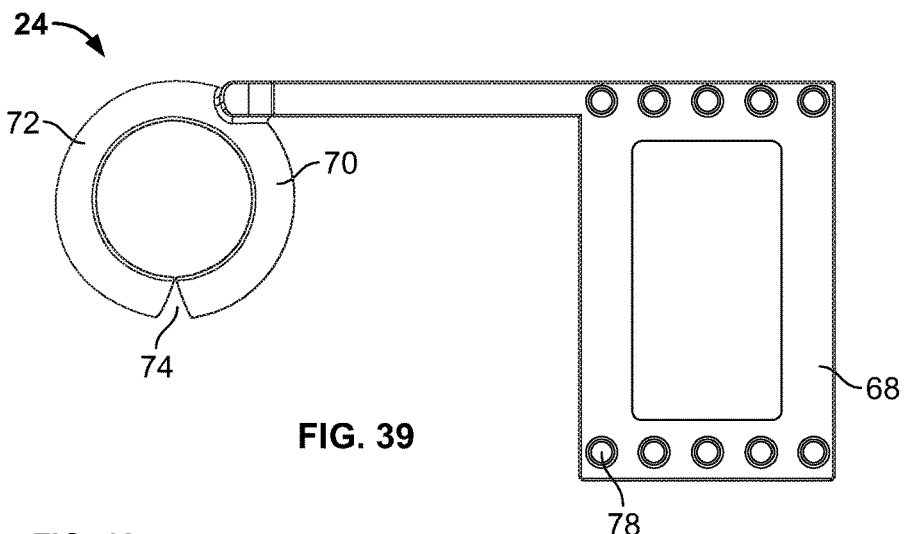
FIG. 39 is a left side view of the slidable carrier module of FIG. 35.
Figure 40:
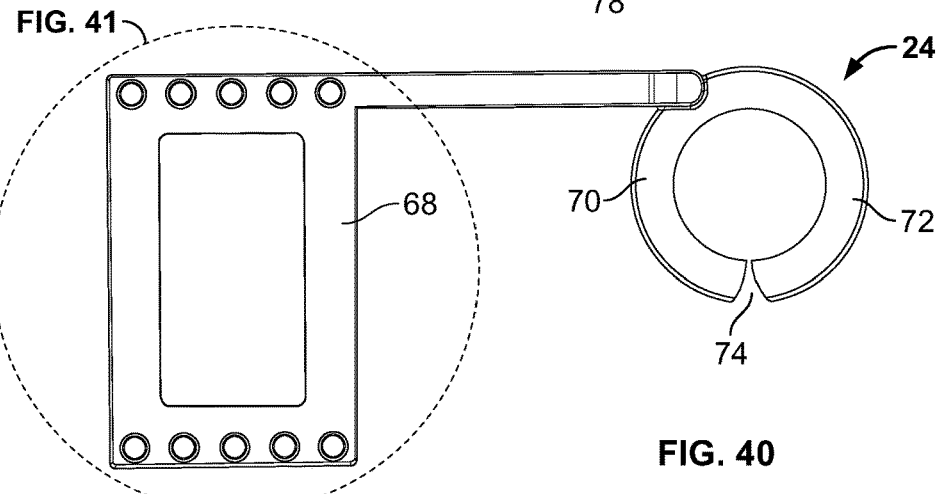
FIG. 40 is a right side view of the slidable carrier module of FIG. 35.
Figure 41:
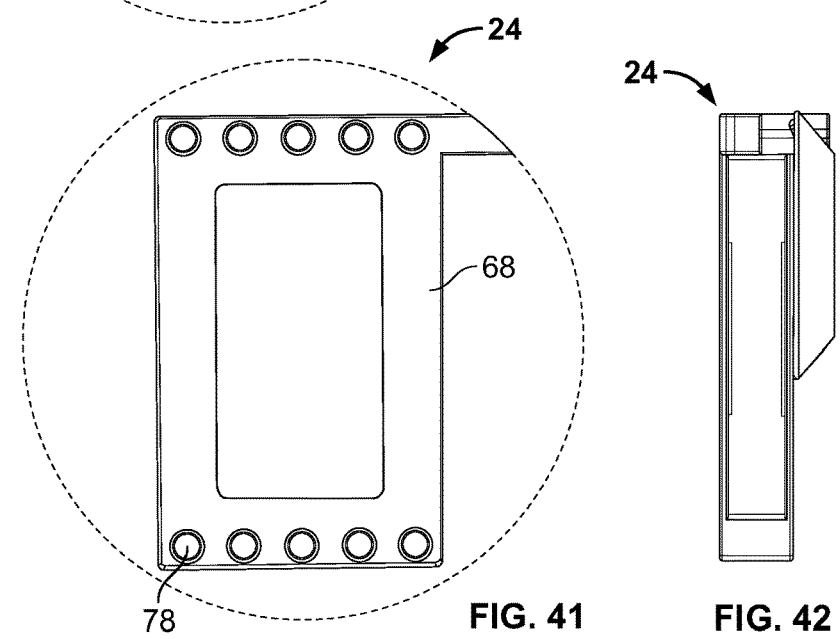
FIG. 41 is a close-up view of a portion of the slidable carrier module of FIG. 40.
Figure 42:
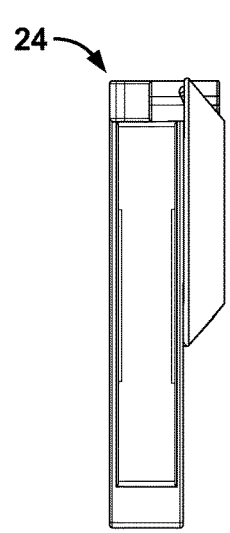
FIG. 42 is a front view of the slidable carrier module of FIG. 35.
Figure 43:
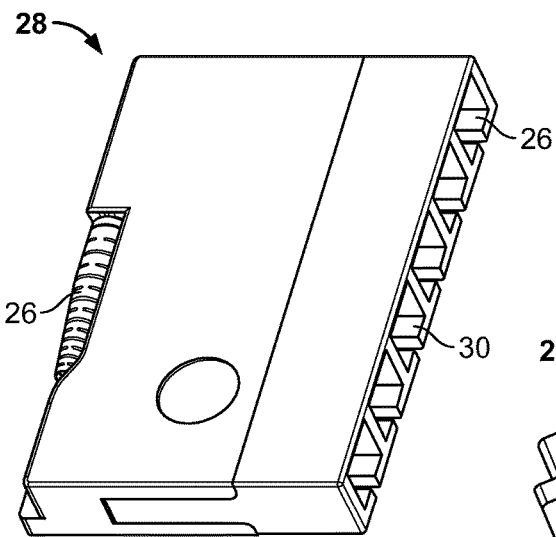
FIG. 43 is a right side, top, front perspective view of a fiber optic cassette configured for placement into one of the slidable carrier modules that is shown in FIG. 35.
Figure 44:
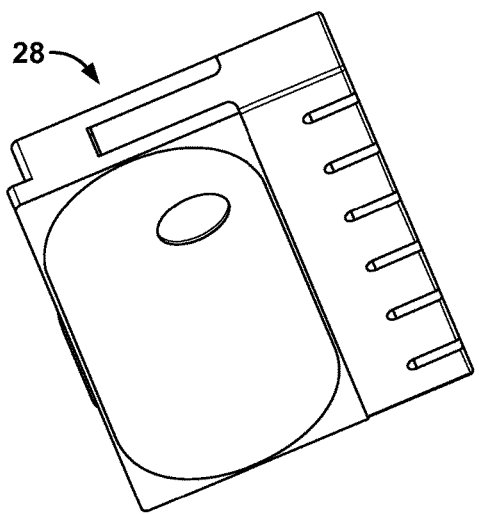
FIG. 44 is a left, top side perspective view of the fiber optic cassette of FIG. 43.
Figure 45:
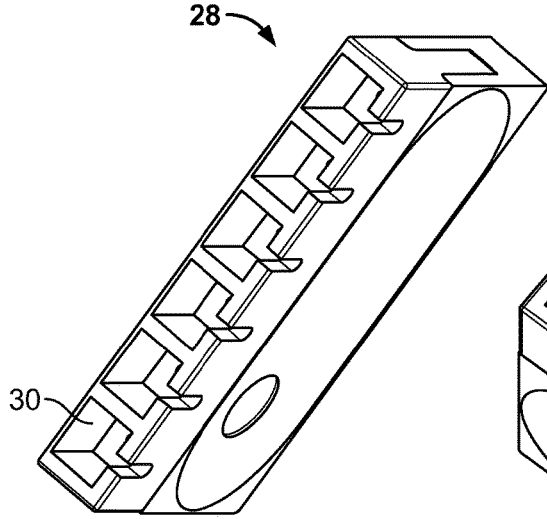
FIG. 45 is a left, bottom side perspective view of the fiber optic cassette of FIG. 43.
Figure 46:
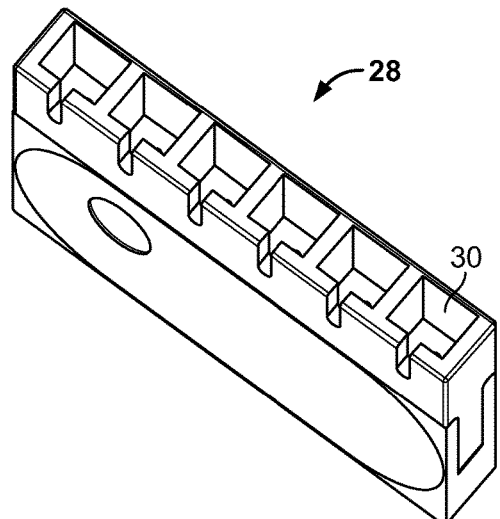
FIG. 46 is a front, left side perspective view of the fiber optic cassette of FIG. 43.
Figure 60:
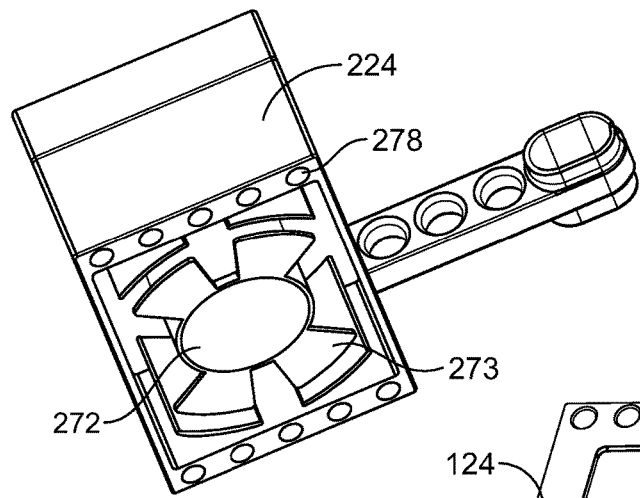
FIG. 60 illustrates a left side, top perspective view of the slidable carrier module of FIG. 51 with a slidable cable storage module coupled thereto.
Figure 61:
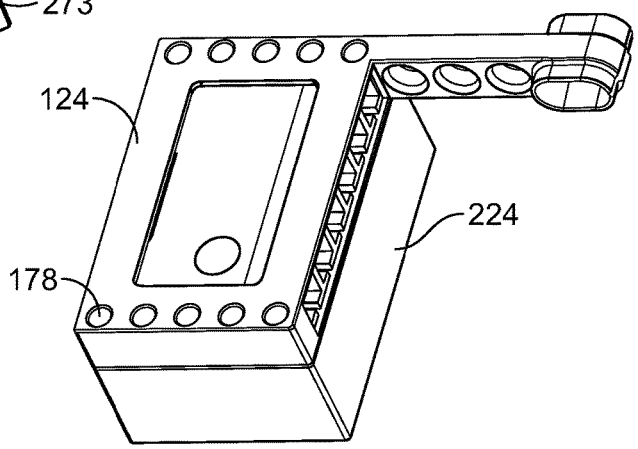
FIG. 61 is a right side, top perspective view of the slidable carrier module and the coupled cable storage module of FIG. 60.
Figure 62:
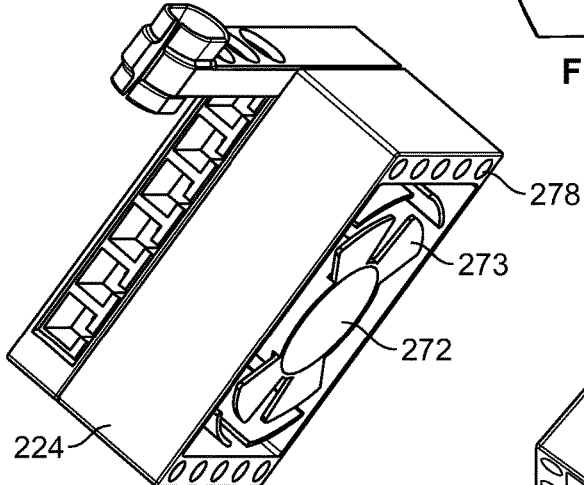
FIG. 62 is a left side, bottom perspective view of the slidable carrier module and the coupled cable storage module of FIG. 60.
Figure 63:
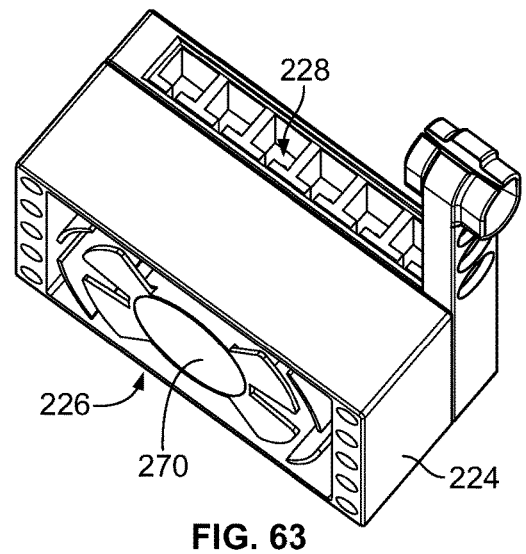
FIG. 63 is another bottom, left side perspective view of the slidable carrier module and the coupled cable storage module of FIG. 60.

FIG. 24 illustrates a side view of the telecommunications frame 52 with only one set of the telecommunications chassis 10 mounted to one side (e.g., the front side 84) of the frame 52 and with a right vertical support 92 of the cable storage panel 54 removed to illustrate the internal cable management structures 102 of the cable storage panel 54. FIG. 25 illustrates close-up views of the top portion and the bottom portion of the telecommunications frame 52 of FIG. 24. Each of the cable management areas 98, 100 defined by the panel 54 includes a circular spool 108 adjacent the top 104 of the panel 54. Aligned vertically with the top circular spool 108, a separate cable management spool 110 having a hook-like cross-sectional profile is provided for each of the chassis 10 mounted on the frame 52. The spools 110 extend across the entire width of the cable management panel 54 between the right and left vertical supports 92, 94.

As illustrated in the example cable configuration shown in FIGS. 24 and 25, when a cable 62 enters the cable management panel 54 from a top 104 of the panel 54, the cable 62 enters between the top circular spool 108 and the center divider 96. A droop loop 63 is formed before the cable 62 is lead over the appropriate spool 110 toward the rear 33 of the cassettes 28 of a given chassis 10. Appropriate amount of slack may be provided by the droop loop 63 for slidable movement of the carrier modules 24 or the pivotable movement of the chassis 10.

The spool 110 positioned adjacent the bottom 106 of the cable storage area 98/100 defines a closed pocket 112 for capturing any cables 62 that might droop into the pocket 112.

Figure 21:
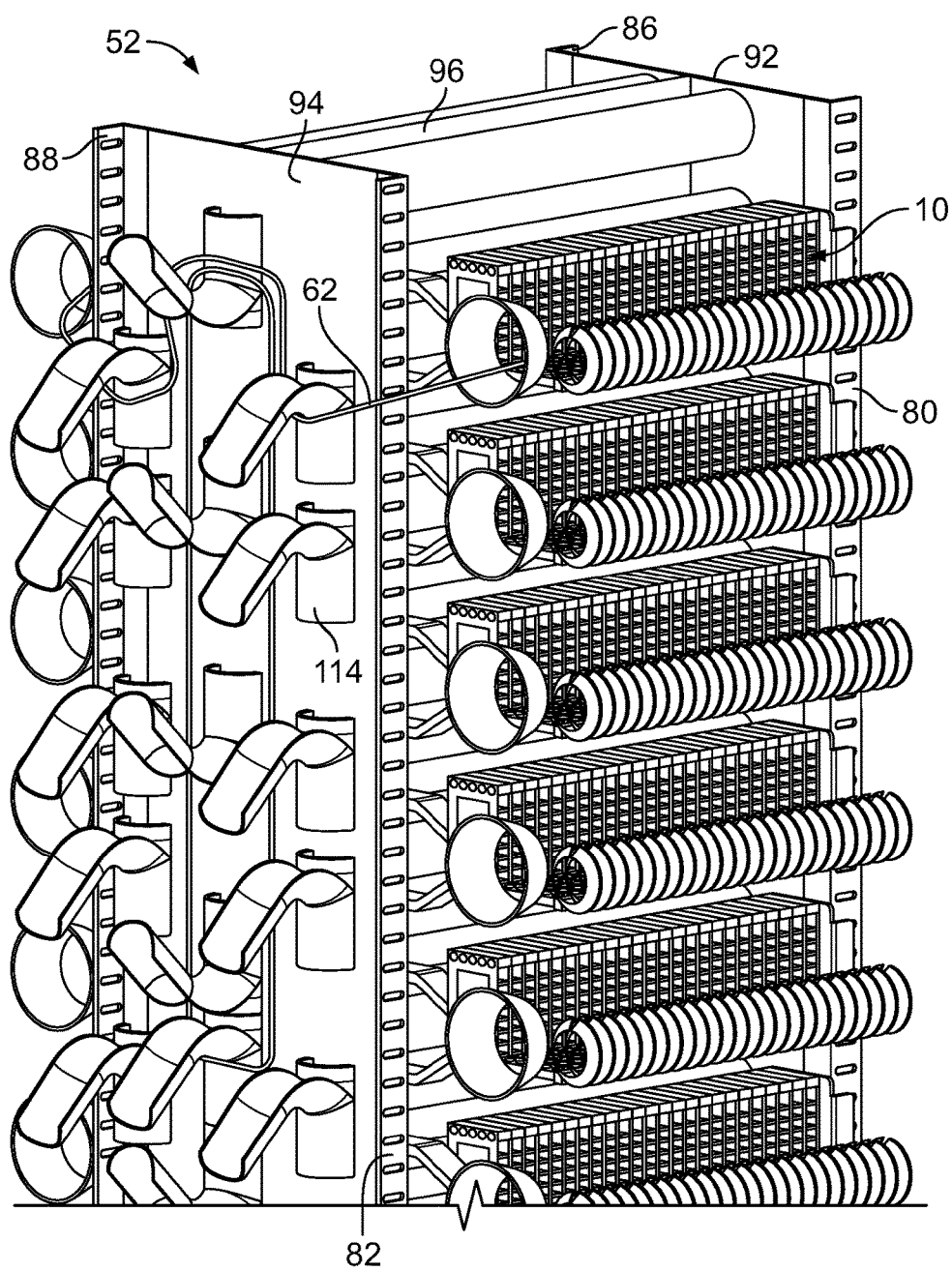
FIG. 21 shows a portion of the telecommunications frame of FIG. 17 with one example cable routing configuration on the left side of the frame.
Figure 22:
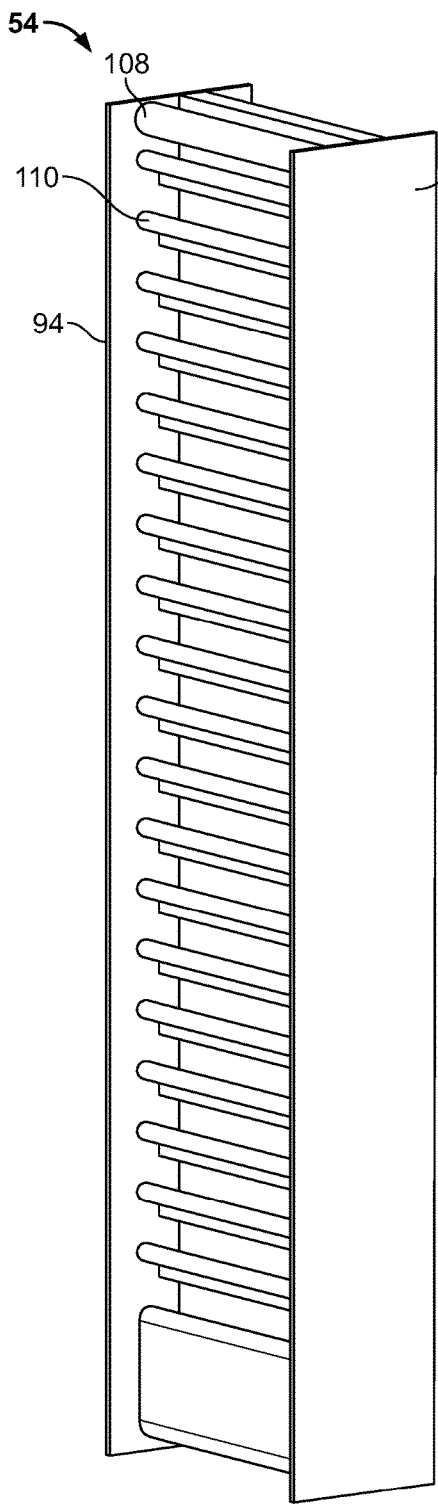
FIG. 22 illustrates the cable storage panel of the telecommunications frame of FIG. 17, the cable storage panel shown in isolation, not mounted to the frame of FIG. 17.
Figure 23:
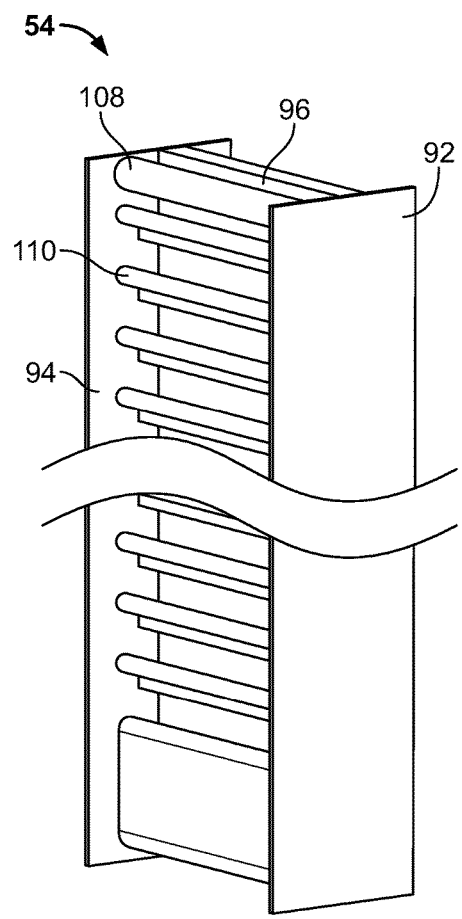
FIG. 23 illustrates close-up views of the top portion and the bottom portion of the cable storage panel of FIG. 22.

Referring now to FIG. 21, according to the example embodiment of the telecommunications frame 52, in addition to cable management within the frame 52, the frame 52 may also include cable management features on an exterior of the frame 52 such as on one of the right and left vertical supports 92, 94 of the cable management panel 54. As shown in the depicted example, cables 62 may be managed by hook structures 114 located on the left vertical support 94 of the cable management panel 54. The hook structures 114 may manage cable routing for cross-connect applications wherein cables 62 may extend from a chassis 10 at the rear 90 of the frame 52 to a chassis 10 at the front 84 of the frame 52.

Cable management structures similar to the hook structures 114 of the present disclosure are described in further detail in U.S. Provisional Patent Application Ser. No. 61/789,572, filed Mar. 15, 2013, entitled "CABLE ROUTING AND STORAGE SYSTEM" and incorporated herein by reference in its entirety.

As shown in FIG. 21, cables 62 extending from the cassettes 28 of the carrier modules 24 are inserted into the split-ring cable management portions 70 of the modules 24. All of the cabling 62 that extends from the individual rings 72 of the modules 24 is then passed through the ring 60 of the slidable cable management module 56.

The alignment of the individual cable management rings 72 and also of the ring 60 of the cable management module 56 allows the carrier modules 24 to be slid along a right to left direction without disturbing any of the managed cables 62. The column of spools 110 within the cable management panel 54 and the cable slack provided in the form of droop loops 63 allow the carrier modules 24 to be slid one at a time right to left until the technician isolates and accesses the desired module 24.

Referring now to FIGS. 51-68, another embodiment of a carrier module 124 that is configured for slidable mounting on the telecommunications chassis 10 of FIGS. 1-8 is shown. The carrier module 124 includes a configuration similar to that of the module 24 of FIGS. 26-42. The carrier module 124 is configured for housing the same type of fiber optic equipment such as the fiber optic cassette 28 housed by the carrier module 24 of FIGS. 26-42 and is configured to be slidably mounted to the chassis 10 of FIGS. 1-8 in a similar manner.

The carrier module 124 defines a smaller cable management structure 170 in the form of a split-ring 172. The split-ring 172 defines a side profile (along a left to right direction) that does not extend past the housing portion 168 of the module 124. The notch 174 is provided at a front side of split ring 172 rather than a top side of the ring, unlike in the carrier module 24 of FIGS. 26-42.

Now referring to FIGS. 60-68 specifically, the carrier module 124 is shown with a slidable cable storage module 224 coupled thereto. The cable storage module 224 can be fixed to the carrier module 124 to form an integral structure 225. Different types of attachment methods may be used to fix the cable storage module 224 to the carrier module 124. The cable storage module 224 includes slide holes 278 that align with the slide holes 178 of the carrier module 124 for slidability therewith. The cable storage module 224 defines a cable storage structure 270 in the form of spool 272 on the left side 226 of the module 224, opposite from the side 228 to which the carrier module 224 is mounted. The spool 272 is configured to store any extra slack cabling 62 coming from or going to the cable ring 172 of the carrier module 124. The spool 272 defines cable retention portions 273 for retaining the cabling 62 within the cable storage module 224.

As noted above, the connection locations 26 provided by the chassis 10 of the present disclosure may be in the form of a cassette 28. An example of a fiber optic cassette 28 that is configured for insertion into the carrier modules 24, 124 disclosed herein is shown in FIGS. 43-50. As shown, one example of the cassette 28 may include fiber optic adapters 30 (LC or SC format) on one side (e.g., the front side of the carrier modules 24, 124 disclosed herein) wherein the opposite side (e.g., the rear side of the carrier modules 24, 124 disclosed herein) either has a rear connection location 26 in the form of a fiber optic connector such as a multi-fiber connector (MPO) or a cable extending outwardly therefrom. Cassettes similar to fiber optic cassettes 28 of the present disclosure are described in further detail in U.S. Patent Publication No. 2013/0089292, which is incorporated herein by reference in its entirety.

It should be noted that the fiber optic cassettes 28 shown and described in the present application are simply one type of a telecommunications device that may be used with the carrier modules 24, 124 of the present disclosure and that the modules may be configured to receive other types of devices.

Although in the foregoing description, terms such as "top," "bottom," "front," "back," "right," "left," "upper," and "lower" were used for ease of description and illustration, no restriction is intended by such use of the terms. The telecommunications devices described herein can be used in any orientation, depending upon the desired application.

Having described the preferred aspects and embodiments of the present invention, modifications and equivalents of the disclosed concepts may readily occur to one skilled in the art. However, it is intended that such modifications and equivalents be included within the scope of the claims which are appended hereto.

The invention claimed is:

1. A fiber optic chassis comprising:
   a right rack mount portion and a left rack mount portion and at least one slide extending between the right and left rack mount portions, one of the right rack mount portion and the left rack mount portion defining at least a part of a hinge structure for pivotally mounting the fiber optic chassis to a telecommunications fixture;
   a plurality of modules mounted on the chassis along a horizontal stack extending between the right and left rack mount portions, each of the modules slidable on the slide along a direction extending between the right and left rack mount portions, wherein each module includes at least one slide hole that is completely surrounded around its periphery, the at least one slide hole extending through the module and defining open ends that are aligned along the direction extending between the right and left rack mount portions, the at least one slide hole configured to receive the slide of the chassis for allowing the module to be slidable between the right and left rack mount portions, each module configured to receive fiber optic equipment defining fiber optic connection locations.

2. A fiber optic chassis according to claim 1, wherein each of the modules is populated with the fiber optic equipment that defines the fiber optic connection locations.

3. A fiber optic chassis according to claim 2, wherein the fiber optic connection locations are defined by fiber optic adapters.

4. A fiber optic chassis according to claim 3, wherein the fiber optic adapters are LC-format adapters.

5. A fiber optic chassis according to claim 2, wherein the fiber optic equipment are fiber optic cassettes removably mounted to the modules, the fiber optic cassettes defining fiber optic adapters at a first end, a cable extending from an opposite second end, and fibers extending within the cassette from the cable to the fiber optic adapters.

6. A fiber optic chassis according to claim 1, wherein each module defines a cable management structure for guiding cables extending to and from the fiber optic connection locations.

7. A fiber optic chassis according to claim 6, wherein the cable management structure defines a split-ring configuration.

8. A fiber optic chassis according to claim 1, wherein one of the right rack mount portion and the left rack mount portion defines a latch for locking the chassis in a closed position when the chassis is not pivoted with respect to the telecommunications fixture.

9. A fiber optic chassis according to claim 1, further comprising a cable management module slidable along the same direction as the modules, the cable management module including a cable management structure in the form of a split-ring configured to manage cables extending to and from the modules.

* * * * *